(12) United States Patent
Mossbarger

(10) Patent No.: US 9,876,775 B2
(45) Date of Patent: Jan. 23, 2018

(54) GENERALIZED ENTITY NETWORK TRANSLATION (GENT)

(71) Applicant: ENT Technologies, Inc., San Diego, CA (US)

(72) Inventor: Timothy Mossbarger, La Mesa, CA (US)

(73) Assignee: ENT Technologies, Inc., San Diego, CA (US)

( * ) Notice: Subject to any disclaimer, the term of this patent is extended or adjusted under 35 U.S.C. 154(b) by 0 days.

(21) Appl. No.: 14/671,131

(22) Filed: Mar. 27, 2015

(65) Prior Publication Data

US 2015/0244690 A1 Aug. 27, 2015

Related U.S. Application Data

(63) Continuation-in-part of application No. 14/075,486, filed on Nov. 8, 2013.

(60) Provisional application No. 61/971,441, filed on Mar. 27, 2014, provisional application No. 61/724,763, filed on Nov. 9, 2012.

(51) Int. Cl.
*H01L 29/06* (2006.01)
*H04L 29/06* (2006.01)
*H04L 9/00* (2006.01)
*H04L 9/32* (2006.01)

(52) U.S. Cl.
CPC ............ *H04L 63/061* (2013.01); *H04L 9/006* (2013.01); *H04L 9/3263* (2013.01); *H04L 63/0823* (2013.01)

(58) Field of Classification Search
CPC . H04L 63/061; H04L 9/3263; H04L 63/0823; H04L 9/006
See application file for complete search history.

(56) References Cited

U.S. PATENT DOCUMENTS

| | | | | |
|---|---|---|---|---|
| 7,949,869 | B2* | 5/2011 | Deshpande | H04L 63/0428 380/277 |
| 8,266,432 | B2* | 9/2012 | Asghari-Kamrani | G06F 21/31 705/67 |
| 2002/0029337 | A1* | 3/2002 | Sudia | G06Q 20/401 713/176 |
| 2002/0108041 | A1* | 8/2002 | Watanabe | H04L 9/3252 713/175 |

(Continued)

OTHER PUBLICATIONS

Shim et al., Federated Identity Management, Dec. 2005, Computer, vol. 38, Issue 12, pp. 120-122 (Year: 2005).*

*Primary Examiner* — Kenneth W Chang
(74) *Attorney, Agent, or Firm* — San Diego IP Law Group LLP; Trevor Coddington

(57) ABSTRACT

Generalized Entity Network Translation provides new state of the art methodology for extending RKI techniques into a truly generalized framework capable of operating at exceptional levels of authenticity without the need for roots, certificate authorities, or other static points in an infrastructure. More astounding is its ability to create trusted authentic entity relationships that require no externally stored state outside of the shared context between discrete peers. The present invention provides, among other things, novel improvements to blockchain-derived systems and provides strong proof of ownership, renewal, roll-backs, and localized state and many blockchain systems more palatable choices for system integration.

11 Claims, 20 Drawing Sheets

(56) References Cited

U.S. PATENT DOCUMENTS

| | | | |
|---|---|---|---|
| 2002/0116611 A1* | 8/2002 | Zhou | H04L 9/004 713/156 |
| 2005/0080899 A1* | 4/2005 | Vogel | H04L 9/3236 709/225 |
| 2005/0097316 A1* | 5/2005 | Kim | H04L 9/3255 713/163 |
| 2005/0138388 A1* | 6/2005 | Paganetti | H04L 63/126 713/185 |
| 2007/0050395 A1* | 3/2007 | Hunter | H04L 9/0866 |
| 2008/0163338 A1* | 7/2008 | Micali | G06Q 20/02 726/2 |
| 2010/0070759 A1* | 3/2010 | Leon Cobos | G06F 21/43 713/155 |
| 2012/0324229 A1* | 12/2012 | Buldas | H04L 9/321 713/176 |

* cited by examiner

|  | Virtualized (1010) | Embodied (1020) | Locked (1030) | Partially Embodied (1040) |
|---|---|---|---|---|
| Datum Encrypted | ✓ |  |  |  |
| Datum Accessible |  | ✓ | ✓ | ✓ |
| Datum Changeable |  | ✓ |  | ✓ |
| Private Key Accessible |  | ✓ | ✓ | ✓ |
| Located on ENT Node |  | ✓ | ✓ | ✓ |
| Able To Take Action |  | ✓ |  | ✓ |

Fig. 10

1. UI Verinym A may request, modify, display info of verinyms on ENT node B.

2. UI Verinym A may also switch execution contexts to a node that is different from B.

GENERALIZED ENTITY NETWORK TRANSLATION (GENT)

CROSS-REFERENCE TO RELATED APPLICATION

The present application is a continuation-in-part application of and claims priority to U.S. patent application Ser. No. 14/075,486, filed on Nov. 8, 2013, and entitled "Entity Network Translation (ENT)," the entire disclosure of which is incorporated by reference herein. The present application also claims priority to U.S. Provisional Patent Application No. 61/971,441, filed on Mar. 27, 2014, and entitled "Generalized Entity Network Translation," the entire disclosure of which is incorporated by reference herein.

BACKGROUND OF THE INVENTION

1. Field of Invention

The present invention relates to applied cryptography and more specifically, to digital certificates for identifying and authenticating abstract identities of persons, entities, and electronic devices. Further, this invention leverages these basic building blocks to address architectural designs of large distributed systems.

2. Description of Related Art

Blockchain systems are global state systems wherein the global state is stored across a distributed number of devices. Examples are networks such as Bitcoin, Ripple, Namecoin, among others. A combination of public/private key cryptography and hash chains provides a mechanism to store arbitrary secure states as a single ledger (i.e., the blockchain) held at all distributed nodes. Nodes update their local state based on "proof of work" hashing algorithms applied to the system as a whole. These systems are interesting in that they provide a secure mechanism for establishing shared common ground across many devices. However, these systems suffer from several intractable problems, including lack of credential renewal, excess computational complexity, and exceptional state storage requirements. Using the inventive techniques taught herein, these weaknesses can be eliminated.

SUMMARY OF THE INVENTION

The present invention overcomes these and other deficiencies of the prior art by introducing a new type of cryptographic key infrastructure designated as a Relational Key Infrastructure (RKI). RKI allows arbitrary entities to be created, form relationships with each other, and leverage those relationships to eliminate fixed architecture in existing public key infrastructure (PKI) systems and provide dramatic new functionality. Generalized Entity Network Translation (GENT) provides new state of the art methodology for extending RKI techniques into a truly generalized framework capable of operating at exceptional levels of authenticity without the need for roots, certificate authorities, or other static points in an infrastructure. More astounding is its ability to create trusted authentic entity relationships that require no externally stored state outside of the shared context between discrete peers.

Additional concepts are introduced that greatly extend the arbitrary use of relational techniques to cover a wide variety of potential uses including resolution, storage determination, namespace assignment, credential repositories, and more. These concepts use the same policy syntax used for renewal and control to introduce systems wherein entities are given numerous configuration choices, unlocking fruitful complexity unattainable in existing systems. The present invention introduces novel embodiments that have not hereto been seen such as a relational blockchain infrastructure (RBI).

In an embodiment of the invention, a method for creating a unique entity identifier for an entity including, but not limited to a person, abstract entity, datum, good, or electronic device, method comprising the steps of: acquiring, at a device, public key data for a asymmetric key pair comprising a public key and a private key; acquiring, at a device, a unique key identifier for the public key data; acquiring, at a device, a set of one or more policies, wherein each policy from the set of one or more policies comprises one or more unique entity identifiers and/or the unique key identifier, and at least one logical operator or mathematical function if a total number of identifiers from the one or more unique entity identifiers and/or the unique key identifier in the policy is greater than one; and calculating a unique entity identifier for the entity, at a device, comprising a hash value of the set of one or more policies. The unique key identifier comprises a hash value of the public key data. The method may further comprise the step of: transmitting, at a device, the set of one or more policies to any other device. The method may further comprise the steps of: receiving, at any device, the set of one or more policies; calculating, at any device, a hash value of the received set of one or more policies; validating, at any device, that the calculated hash value of the received set of one or more policies matches the unique entity identifier; and authenticating, at any device, a received message signed using one or more private keys. The method may further comprise the steps of: replacing one or more unique entity identifiers within the set of one or more policies with numeric or logical values; and evaluating the set of one or more polices with the replaced one or more unique entity identifiers to produce an affirmative or non-affirmative result. The method may further comprise the steps of: receiving, at a device, a message; and authenticating the received message, wherein the step of authenticating comprises: evaluating the set of one or more policies with the replaced one or more unique entity identifiers to produce an affirmative or non-affirmative result. The method may further comprise the steps of: authenticating the received message against one or more public keys represented by the unique key identifiers; and if the received message is authenticated, replacing that unique key identifier with a numeral or logical value. The method may further comprise the step of replacing one or the one or more unique identifiers within a policy with at least one policy used to create the replaced unique identifier. The method may further comprise the steps of recursively replacing the one or more unique identifiers within a policy with at policies used to create the replaced one or more unique identifiers. The method may further comprise the step of replacing the unique entity identifier with a new unique entity identifier reflecting one or more updated or more accurate policies for the entity. The replacement of the unique entity identifier with a new unique entity identifier is authorized by the set of one or more policies. The replacement of the unique entity identifier with a new unique entity identifier is authorized through evaluation of the set of one or more policies.

In another embodiment of the invention, a method for authenticating a unique entity identifier for an entity including, but not limited to a person, abstract entity, datum, good, or electronic device, method comprising the steps of: receiving, at a device, a set of one or more policies, wherein each policy from the set of one or more policies comprises one or more unique entity identifiers and/or unique key identifiers, and at least one logical operator or mathematical function if a total number of identifiers from the one or more unique entity identifiers and/or unique key identifiers in the policy is greater than one, wherein each unique key identifier comprises a hash value of public key data associated with a asymmetric key pair comprising a public key and a private key; receiving, at a device, a message signed using one or more private keys; receiving, at a device, a unique entity identifier; calculating, at a device, a hash value of the received set of one or more policies; validating, at any device, that the calculated hash value of the received set of one or more policies matches the unique entity identifier; and authenticating, at a device, the received message.

Using the novel techniques presented herein, a new paradigm for creating digital systems emerges. The extended ability of verinyms to hold and manage state, an eco-system of providers that can serve the needs of verinyms, and a rich environment of ownership, contract agreements, and control policies, yields a system that has no existing parallel in modern technology. These extensible features allow a basis for a new digital foundation of authenticity, trust, and privacy that will fuel the emergence of highly resilient digital property ownership. The present invention improves, among other things, blockchain derived systems. For example, the present invention provides strong proof of ownership, renewal, roll-backs, and localized state. It makes blockchain techniques more palatable choices for system integration.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 10 illustrates verinym states according to an embodiment of the invention;

DETAILED DESCRIPTION OF PREFERRED EMBODIMENTS

Figure 1:
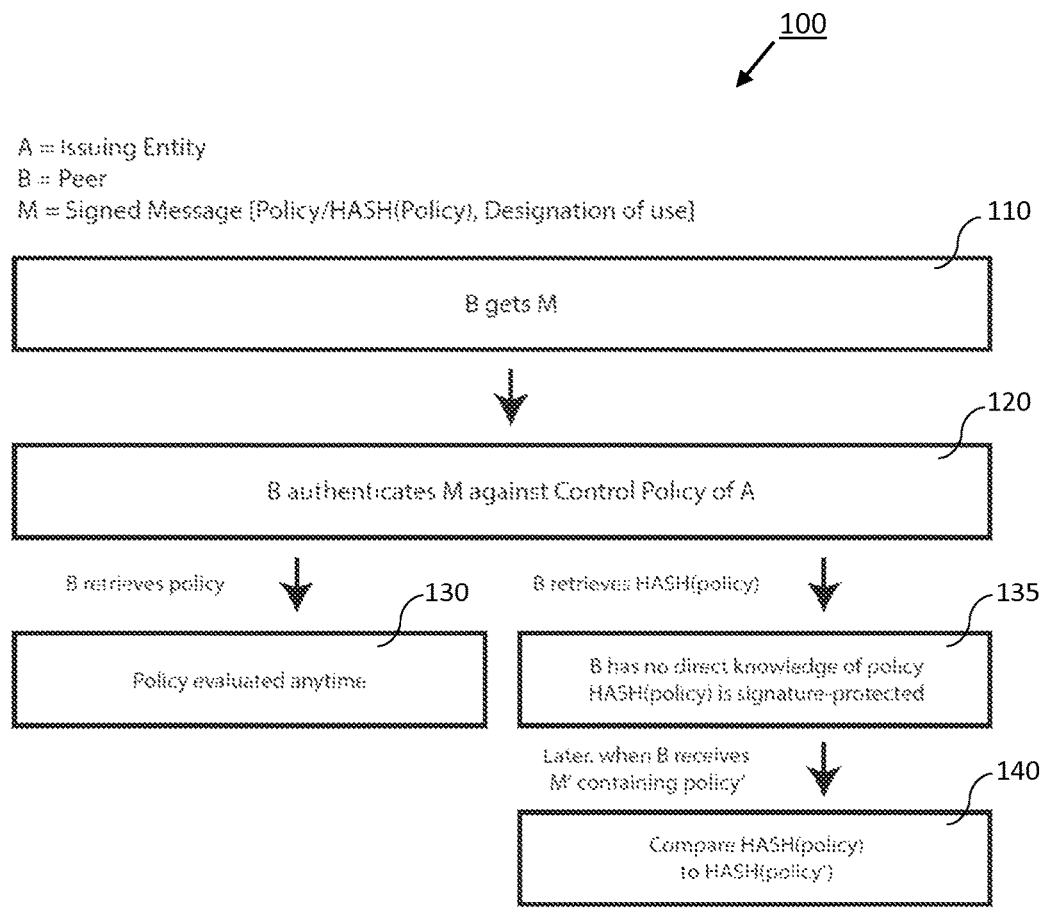
FIG. 1 illustrates a policy evaluation process according to an embodiment of the invention.

Preferred embodiments of the present invention and their advantages may be understood by referring to FIGS. 1-21, wherein like reference numerals refer to like elements. There are numerous embodiments of the present invention. Some implementations may integrate with existing public key infrastructure (PKI) systems.

The present invention builds upon the Entity Network Translation (ENT) concept disclosed in co-pending, parent U.S. patent application Ser. No. 14/075,486("the '486 application"), the entire disclosure of which is incorporated by reference herein. ENT techniques are applicable to existing PKI principals of authenticity and identification through applied cryptography. These principals are vital to digital systems, as identity is a foundational building block of any sophisticated system.

The present invention introduces a cryptographic key infrastructure designated as a Relational Key Infrastructure (RKI). RKI allows arbitrary entities to be created, form relationships with each other, and leverage those relationships to eliminate fixed architecture in existing PM systems and provide dramatic new functionality. These entities and their credentials are called verinyms in the '486 application and ENT parlance. In the '486application, a set of root verinyms is required to anchor the system. These root nodes can be thought of as fixed or static architectural entities that can incur costs and present obvious attack points. While these points can be widely distributed, it may be useful to eliminate any static architectural points completely. This provides an opportunity both for cost savings and/or better distributed resilience of the overall system. It would be advantageous to extend the core concepts of relational ownership, control into arbitrary functionality based on agreements. This can be done by extending the narrow policy notions in ENT systems to include a more generic agreement infrastructure and by introducing notions of data ownership attached to owned entities.

Generalized Entity Network Translation (GENT) as taught herein provides new state of the art methodology for extending RKI techniques into a truly generalized framework capable of operating at exceptional levels of authenticity without the need for roots, certificate authorities, or other static points in an infrastructure. More astounding is its ability to create trusted authentic entity relationships that require no externally stored state outside of the shared context between discrete peers. Some of the techniques disclosed herein provide novel improvements to blockchain-derived systems and provide strong proof of ownership, renewal, roll-backs, and localized state and may blockchain systems more palatable choices for system integration.

Additional concepts are introduced that greatly extend the arbitrary use of relational techniques to cover a wide variety of potential uses include resolution, storage determination, namespace assignment, credential repositories, etc. These concepts use the same policy syntax used for renewal and control to introduce systems wherein entities are given numerous configuration choices, unlocking fruitful complexity unattainable in existing systems.

The goals of a GENT system are generally to remove any static infrastructure in a highly authentic identification system. More formally, the goals, according to the one or more embodiments disclosed herein are to:

1. Create a fully distributed system wherein no entity needs to act as a root, certificate authority, or with elevated privilege or state in relation to other entities.
2. Provide authentication, renewal and extension of trusted relationships across cryptographic primitive boundaries.
3. Provide strong identity, equivalent to the strength of ENT at any given instant given equivalent resources.
4. Improve blockchain systems and provide strong identity on par with existing ENT derivative systems.
5. Preserve the advantages present in ENT including industrial strength cryptography, self-service, delegation, and resilience.
6. Extend ENT system techniques to arbitrary agreements outside of the ownership, renewal and control characteristics outlined in previous work.
7. Extend utility through development of verinym state data and operational malleability.

The following general definitions are provided to assist the reader.

PPK—a public/private key pair generated using asymmetric key cryptographic techniques. PrK is the private key portion of a PPK. PpK is the public key portion of a PPK.

A "signed message" M is a datum, appended with the encrypted hash of the datum such that M+SIGN(HASH(M), PrK) constitutes the entire message. PrK represents the private portion of a PPK generated using asymmetric cryptographic techniques.

A "certificate" is a signed message wherein the datum contains the PpK of a PPK and an identifier for the entity being certified. A "self-signed certificate" is a certificate wherein the datum contains PpK and the signature was generated using PrK, where both PpK and PrK are both part of a single PPK.

A "policy" is a mathematical statement containing mathematical operators and verinym identities, and unique PPK identifiers, such as those found in a certificate. Evaluation of this statement uses ENT evaluation rules. An "ownership policy" is a policy that is used for renewal or modification of the credential for an entity, or its definitive data.

An "authorized message" is a signed message wherein the signatures are by one or more PrK, when executed through an entity's policy against matching PpK entities in that policy, evaluate the policy to be true. Depending on message type, different policies may be used for this comparison.

A "control policy" is a policy that is used to determine authorized messages, and is also used to define explicit group membership for verinyms that represent groups.

A "policy hash" is defined by function HASH(policy), where the HASH function used is a secure cryptographic hash.

Use of "entity" or "verinym" in this document may be interchanged, depending on implementation.

A "verinym" is an entity represented by a unique identifier and one or more authentic credentials that contain ownership and control policies, or hashes thereof, or means to renew credentials using relational authorization. "Verinym" may be used in context to reflect the verinym identifier, or an entity represented by the above criteria.

Policies, Novel Mechanisms for Authenticity

Policies are mathematical statements containing entity identifiers, public key identifiers (hashes), and logical functions such as, but not limited to AND, OR, MAJORITY, etc. In some embodiments of the invention, the mathematical statements are Boolean statements. A policy statement is executed to retrieve a policy truth value result. Policy truth values are used to evaluate whether an action, authentication, or operation should occur. In one embodiment, the truth value result may represent the magnitude of result. A policy is evaluated by executing the policy against a list of authorized source entities. In some embodiments, an authorized source entity is an entity that has created an authorized message or data or action, and that exists in the policy by its identifier, typically a verinym id. If an authorized source is hash of a PpK, for instance, that authorization may include a document signed using the PrK. Entity authorizations, in some implementations, include the execution of the control policy of that entity. In some implementations, if the execution of that policy evaluates to true or magnitude greater than zero, the policy is fulfilled and the action is treated as authentic. For each entity in a policy that authorized an action, the entity is replaced with a value of true when evaluating that policy. Each non-authorized entity in the evaluation of a policy is replaced with a value of false or zero. In some implementations, if the policy statement evaluates to true, given these substitutions, the policy statement is satisfied and represents an authentic action. To be clear, in most implementations, each entity in a policy is replaced by the control policy for that entity, until the policy contains only entities that directly represent PPK hashes.

Consider the following brief exemplary embodiment of the invention. Define entities A, B and C with PPKs, PKA, PKB, PKC, respectively. A has control policy "PKA", B has control policy "PKB", and C has control policy "PKC". That is, the policies consist of only the PPK for that entity. Policy P exists with form "AND(A,B,C)" and is used to authenticate message M. P returns true if M was authorized by all of A, B and C. Examining the control policies for each of these entities we can conclude that M is authentic if signed by PrKA, PrKB and PrKC. That is, entities A, B and C are replaced in P with their control policy statements "PKA", "PKB", and "PKC", respectively, yielding a P' of "AND (PKA,PKB,PKC)". P' is then re-evaluated to produce a result. If A did not use PrKA to sign M, for example, then the policy evaluation would not produce a true result, and the authentication would fail. If A had two keys PKAy and PKAx, and a control policy of "AND(PKAy,PKAx)", then P expanded to P' would be "AND(PKAx,PKAy,PKB,PKC)". If A did not sign with both of these keys, the policy would evaluate to false, and the authentication would fail.

A policy has information that, in some implementations, needs to be kept private. Information leakage is of critical concern in many systems. It is vital that information not be publicized about an entity as this information can be used to build a profile of an entity or reveal secrets. Leaked information reduces privacy and may reveal additional attack vectors on the security of that entity. In some implementations, it is necessary to mask a policy while still allowing authenticity of a policy. To meet these goals, some implementations may utilize a policy hash.

One critical requirement of policies and/or policy hashes, depending on implementation, is that they are recorded in signed or authorized messages. The utility of a policy depends entirely on its authorized existence and authentic use. If an attacker may spoof an entity's policy or policy hash, that entity has no protection from spoofing, false authorizations, etc. It is therefore vital that all policies created by an entity exist in an authorized message created by that entity or its owners. Such a signed message, in some implementations, may be a certificate. In some implementations, a policy or policy hash exists in a separate signed message that is sent on demand. In some implementations, a signed message is replaced with an authorized message.

In some implementations, an on-demand message may contain the full policy while the certificate for the entity contains only the policy hash. FIG. 1 illustrates a policy evaluation process 100 according to an embodiment of the invention. The process 100 is implemented by a peer B and proceeds through the following steps. First the peer B retrieves (step 110) a signed message M or credential containing either the policy or a policy hash and a designation what that policy is to be used for, such as control, renewal, or another type. The peer authenticates (step 120) the message M to ensure it is from an authorized source. For example, the peer B authenticates the message M against the control policy of an issuing entity A. If the peer B retrieved a policy, that policy can now be evaluated (step 130) at any time. If the peer B retrieved a policy hash, the peer has (step 135) no direct knowledge of the policy. It has a signature-protected hash that it can compare (step 140) against a future received policy message. At this later time, if the peer B receives a signed message M' containing a policy, that peer can compute and compare the hash of the received policy against the policy hash found in the originally received certificate or message M. The entity A whose policy is being used, or peers thereof, can control access to information about itself using this method.

As a clarification, the message containing a policy need not be authentic if the computed hash of that policy matches an authentic policy hash already held by the peer B. That is, the source of a policy message does not matter as long as the computed hash of that policy matches an authentic policy hash already held.

Figure 2:
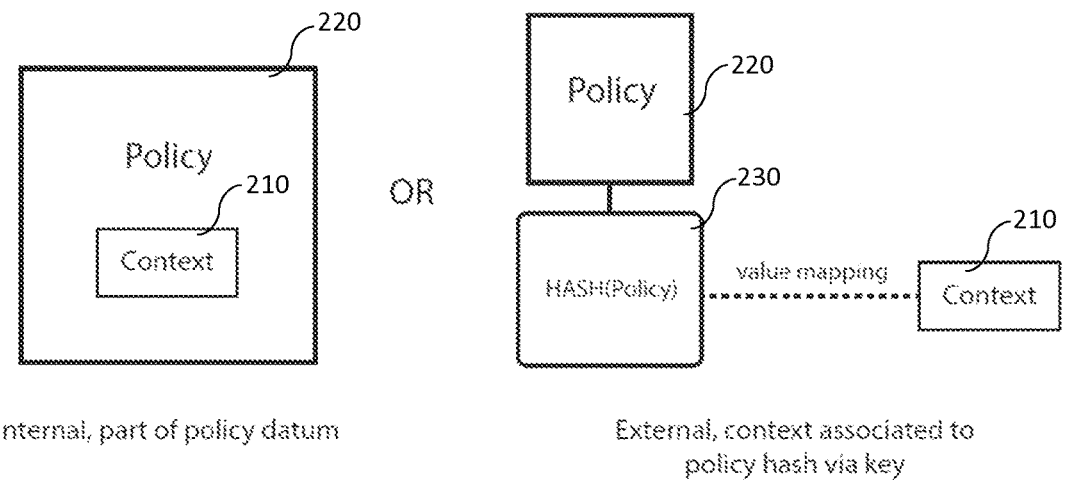
FIG. 2 illustrates policy contexts stored internally as part of a policy datum or externally through a policy hash according to an embodiment of the invention.

Policies have a context. Referring to FIG. 2, in some implementations, the policy context is identified in a signed message by a context identifier. This may be a textual identifier such as "control" or "ownership", or may be an identifier that represents an entity that manages the standard for that policy context. Policy contexts 210 may be stored as part of the policy datum 220. In other implementations, policy contexts 210 are stored externally and are associated to the policy hash 230 by key,value mappings. This allows a lookup by context of the specific policy hash to use. This policy hash can then be used to retrieve the pertinent policy.

Two common contexts for policies in the ENT system are the control policy and the ownership policy. In some ENT implementations, control policies are generalized replacements for a private key signature as an authorizing act in PKI systems. This has substantial benefit in standardizing multi-party authentication needs while allowing customized use of the technology. Such generalized replacements are referred to above in the definitions section as "authorized messages." That is, authorized messages are authenticated against policies.

Another type is the ownership or renewal policy. Ownership policies are policies used to replace any number of policies, including itself, associated with an entity. In typical implementations, ownership policies are used to replace entity credentials. The ownership mechanism allows generic lateral control of entities via well trusted peers, and is a groundbreaking improvement over the strictly hierarchical control existing in modem PKI systems.

In some embodiments, policies have a hierarchical ordering. For example, namespace policies may override ownership policies, which may override control policies, which may override other policy types.

Policy Generalizations:

Policies can be improved and generalized. Generalized policies use the form of policies so far discussed, but apply new principals to extend their utility. One improvement is to allow the mathematical operators themselves to have semantic meaning in addition to the actual execution of the policy.

In traditional policies the execution result of the policy is usually the focus. The logical statements used, the operators, the ordering of the statement and other details are typically not vital to the final execution result. However, in some implementations, the semantics of the policy may contain vital context specific information. It may be that the important criterion is the specific order of entities in a statement. In some implementations, this ordering may represent the hierarchy of precedence, such that an entity earlier in the statement represents an entity that may be the first entity an operation is attempted against. In another embodiment, the ordering may represent a preferred list of operation recipients with later-appearing entities being less preferable.

In one embodiment, an array or ordered set of policies is referenced by a policy context. The order of this array has semantic meaning wherein the first element has precedence over subsequent elements; the second element has precedence over subsequent elements, and so on. In some implementations, this ordering is equivalent to a policy wherein multiple inner policy groups are executed in a single OR grouping. That is, all elements are OR'd together in a single statement. The advantages of having a single top level array are multiple. Execution speed and simple precedence determination simplify the needed logical operations performed. This has a direct benefit in execution efficiency. Ordering of a top level array is often simpler than modifying ordering in a logical statement. Such an array is easy to extend with new policies introduced to reflect changing organizational patterns without affecting higher authority policies. Finally, having precedence in policy ordering allows user, admin, super-user and other hierarchical authority mechanisms to exist that likely reflect ever-more stringent requirements to be achieved. As an example, certificate renewal authority may include an array with two elements. The last element is a single machine. The first element in the array could be a group of eleven individuals who vote as a group to renew the certificate. If the single machine is compromised, the renewal can instead be overridden by the more stringent mechanism of having individuals communicate and act as a group.

In some implementations, entities may implement recursive policies. That is, an execution of policy containing entity X may thereafter invoke recursion of one of entity X's policies. This recursion may continue until a loop is found or a fundamental implicit entity is discovered. In one embodiment, a policy for ownership or control may implement recursion until a PPK is found. In one embodiment, a policy used for network resolution may implement recursion until an IP address or DNS name is found. In one embodiment, a recursion of a policy for policy context A may cause the recursion of policy in policy context B. That is, a resolution policy may lead to a recursion of the control policy, etc.

In one embodiment, policies represent composition of other entities. Fractal group composition is one of the core symmetries found in ENT systems. An entity's control policy is used, in some implementations, to allow that entity to act. If the control policy contains other entities, those entities must authorize the action via their own control policies, and so on. This reveals a pattern of composition of entities into an explicit, highly integral entity that represents the group. That is, this technique allows the definition of an entity as a group of entities. Further, it is only through the authorizations of the group via recursion that the entity itself may act. This entity may in turn be added into another composite group, allowing entities to cooperate, identify, and manage highly complex systems. In some implementations, we can thus generalize policies with the following statement: Each policy represents a first class entity whose identity is fixed. That is, the identity may not be modified. This understanding is useful, especially when dealing with ad-hoc entities, or entities formed on the fly for specific purposes.

In one embodiment, ad-hoc verinyms may be used in policies as verinyms or as first class verinyms in other contexts. In one embodiment, the identifier of the ad-hoc verinym is the hash of the policy used to control the verinym. In typical implementations, the control policy is used. Ad-hoc verinyms typically do not have explicit signed credentials. They rely on the authenticity of the message or context in which an ad-hoc verinym appears. In one embodiment, a policy context may contain an ad-hoc verinym instead of a policy. In one embodiment, a policy may additionally contain one or more ad-hoc verinyms. To evaluate an ad-hoc verinym, the policy whose hash matches the ad-hoc verinym id must be present. That is, some policy must exist and be accessible at the time of policy evaluation in order for an ad-hoc verinym's action to be evaluated to true. If the policy is found, the ad-hoc verinym id may be replaced in the policy with the ad-hoc verinym's policy. If the ad-hoc verinym's id appears in a policy context, the ad-hoc verinym's policy may be used and evaluated in the normal way.

In one embodiment, ad-hoc verinyms may be generated on demand from a set N of verinyms or PPKs. In this case, a policy is created, each member of N is added to that policy, and the hash thereof dictates the ad-hoc verinym identifier. In one embodiment, the members of a set may be ordered, such that their ordering is canonical. This has the benefit of allowing any set of verinyms in a policy of matching form (such that the operators are the same in each policy) to be compared or matched. Further, only entities knowing N may reconstruct the matching policy. In one implementation, policies may additionally contain a salt value. Ad-hoc verinyms constructed from N and a policy containing a salt value will be masked even from entities that have N, unless those entities additionally have the salt value.

In one implementation, ad-hoc verinym policies may be included in messages. This allows a message, capable of targeting only one verinym, to instead target a group of verinyms. In this case the target field of the message is replaced by an ad-hoc verinym identifier. If the message contains a policy whose hash matches the target, each member of the policy may be used as an additional target for the message. Conversely, a message may originate from an ad-hoc verinym, allowing a set of verinyms to collaborate in the authorization of a specific message. In one implementation, an ad-hoc verinym defined from an ownership policy may be the source of an authorized message that modifies the credentials of a verinym. One advantage is that authorization of the message is identical to authorization of the policy. That is, if the message is authentic, and the entity authorizing the message is an ad-hoc verinym, then the policy evaluation is also successful. Ad-hoc verinyms actually underlie the operation of credentialed verinyms. If a message originated from a credentialed verinym, that verinym's control policy is typically used to check the authenticity of that message. One could therefore argue that the verinym's control policy hash actually represents one "acting identity" of that verinym. This is intriguing as it implies that a verinym may have multiple pseudonym identities capable of authorizing an identical action.

In one embodiment, policies contain an escrow timer value. This value is used to delay execution of a policy until the timer expires. In this way, loss of control of keys or entities that could authorize a policy can be rectified at any time during the escrow period. This prevents an attacker from immediately causing damage or being able to take action. In one implementation, a policy with higher precedence can override or rebut a policy execution during this escrow period. In one implementation, re-executing a policy during the escrow period can override or rebut the previous execution of that policy. In some implementations, the policy context contains the escrow period instead of the policy. In one embodiment all policies in the ordered set may use the same escrow value.

In one embodiment, policies or an ordered set of policies in a policy context may implement an encumbrance feature. This feature may be used to cleanly separate ownership of the verinym from the control issued to the lessee/user of the verinym. This is useful in many contexts where a verinym may represent or contain some value. As one example, verinyms may be used to identify real property. In this case an encumbrance may represent a contract between the property owner and property renter. It would be unfair for the owner to retain renter rights. A verinym owner could, after taking money or due consideration from a verinym renter, reset or otherwise disable the renter's ability to access or use the verinym. However, it is also unfair for a renter to gain full ownership rights of a verinym. What is needed is a neutral party that enforces an agreement between owner and lessee. In typical implementations, the natural arbiter in ENT systems is the namespace service provider. The entity assigning the name has the ultimate authority of replacing one verinym's credentials with a newer version. Typically, this replacement is entirely dictated by the owner, and the namespace provider simply executes that order. However, using an encumbrance feature, the namespace provider can become an arbiter between the owner and renter.

In one implementation, an encumbrance operator may be used in a policy that contains one or more entities, operators, and a timestamp. In one implementation this timestamp represents a fixed future time at which the encumbrance is no longer effective. In one implementation, entities in a policy grouped within the encumbrance operator are ignored at any time after this timestamp. That is, the encumbrance operator has no effect on policy evaluation once it has expired.

In one implementation, a policy context may have one or more policies that contain encumbrance operators. In one typical implementation, renewal of the policy credentials for that verinym may not remove, modify or reorder a policy that contains an encumbrance operator. In one embodiment, a namespace service provider will not allow a policy containing non-expired encumbrance operators to be removed, added or reordered when renewing or issuing a verinym credential.

In some implementations, the contents of policies may not be known to namespace service providers, roots, or other entities performing renewal services because only the policy hash is known. In this case, the encumbrance operator and timestamp may exist in the policy context, and may explicitly state which policies are encumbered. While the policy and entities within are masked and private through use of the policy hash, the namespace service provider or renewing entity will still have information about encumbrances and can perform correctly.

In one embodiment, policies may evaluate to an entity identity instead of a true or false value. In one embodiment, policies may evaluate to a list or vector of entities instead of a true or false value, or a single entity.

In one embodiment, certain policies can be changed through execution of an ownership policy. That is, policies may be replaced by other policies through execution of an ownership policy. In one embodiment, some polices can be changed through execution of a control policy.

In some implementations, certain policies may take precedence over other types of polices. For example, an ownership policy decision may override a control policy decision, which itself may override a delegation policy, etc.

In one embodiment, entities may have additional values associated with them in policy statements, and these values may be tested against thresholds in order for the policy to evaluate to true. In one implementation, each entity has a "shareholder" value that represents its value or stake in the entity. In one implementation, during execution of the policy, these values are summed and compared against a threshold value that determines whether the policy evaluates to true or false.

In some implementations, the logical functions/operators may also have stand-alone semantic meaning outside of the meaning associated with evaluation of the policy. In one embodiment, a logical OR operator may signify that a datum may be pulled from any entities operated on by the OR function. In one embodiment, an AND may signify that a datum is to be reconstructed from the data sources of all entities operated on by the AND.

With attention on the extended use of policies as contextual control mechanisms, it is useful to include additional new definitions around policies, and how those policies relate to various entities.

Service Consumers:

Let a "service consumer" denote an entity, typically a verinym, that has associated with it a policy for a specific service. The policy may be stored in the entity's credentials or in another message. Services may be such things as renewal, ownership, control, namespace assignment, storage, computer execution, network resolution service, etc.

In some implementations, services may be mapped to policies via a policy context. In some implementations, multiple services may use the same policy or policy context within a given service consumer.

In some implementations, an entity may have associated with it many policy contexts and many policies. In this case the entity is a service consumer of multiple services.

In typical implementations, an entity may be both a consumer of services, and also a provider of services. It is typical, for instance, for a verinym to both own other verinyms, and be owned by other verinyms.

Service Providers:

Let a "service provider" denote an entity listed within another entity's policy associated with a specific policy context. In some implementations, such entities have been explicitly set as the entities that will provide the service designated by the policy context. For example, an entity set as a service provider for policy context "resolution" would act as a resolver.

In traditional PM systems, ownership structure is defined by a hierarchy from a certificate authority (CA). In ENT, this concept is modified so that identity extends from a group authority (GA) and ownership (specifically renewal actions) extends from a lateral agreement with peers. In a typical implementation, we have three separate service consumers and providers. First, we have the namespace provider. This is equivalent of a traditional hierarchy, where all unique names can be reverse traced to a GA, and all name issuance originates from a GA or verinym with a unique name. Second, we have a policy that dictates the ownership service providers. This policy includes peer verinyms which act, via the policy specification, as a renewal authority for the policy's entity and all its information. Third, we have a control policy. This is equivalent in traditional PM systems to a user PPK. PrK portions are used to "control" an entity via signing. In some implementations, these keys also allow the entity to receive encrypted traffic. The party having access to a PrK effectively "controls" the entity whose PrK is associated with. Likewise, in ENT systems, a group of parties, according to a control policy, execute the entity jointly based on that policy agreement. Discussion of each of these policies follows.

Namespace Service Providers:

Name and identity assignment is a key operation performed in many implementations of ENT systems. It allows users to maintain perpetual static names that have very strong authenticity. In some ENT systems, this namespace assignment is done through root servers or a GA. In some implementations, names are assigned on demand, and a new unused name in the space owned by an entity is assigned. In existing ENT systems, these names are assigned directly by the entity owning the namespace. In one exemplary embodiment of a DNS-like namespace, entity "charles.com" owns the "charles.com" name. Assignment of names such as "phone.charles.com" originate directly from the "charles.com" entity because that entity owns the space.

Namespace Service Providers offer a flexible alternative that can "outsource" name assignment to a set of entities defined by a policy that may have better resource availability, stability, security, etc. than the entity itself. This frees the entity from having to support namespace assignment themselves. In some implementations, namespace policies may contain both PPK identifiers and namespace service providers. In typical implementations, namespace policies may have diverse contents, but PPK identifiers denote that the entity holding the PrK for the PPK may assign identities in its namespace.

Figure 3:
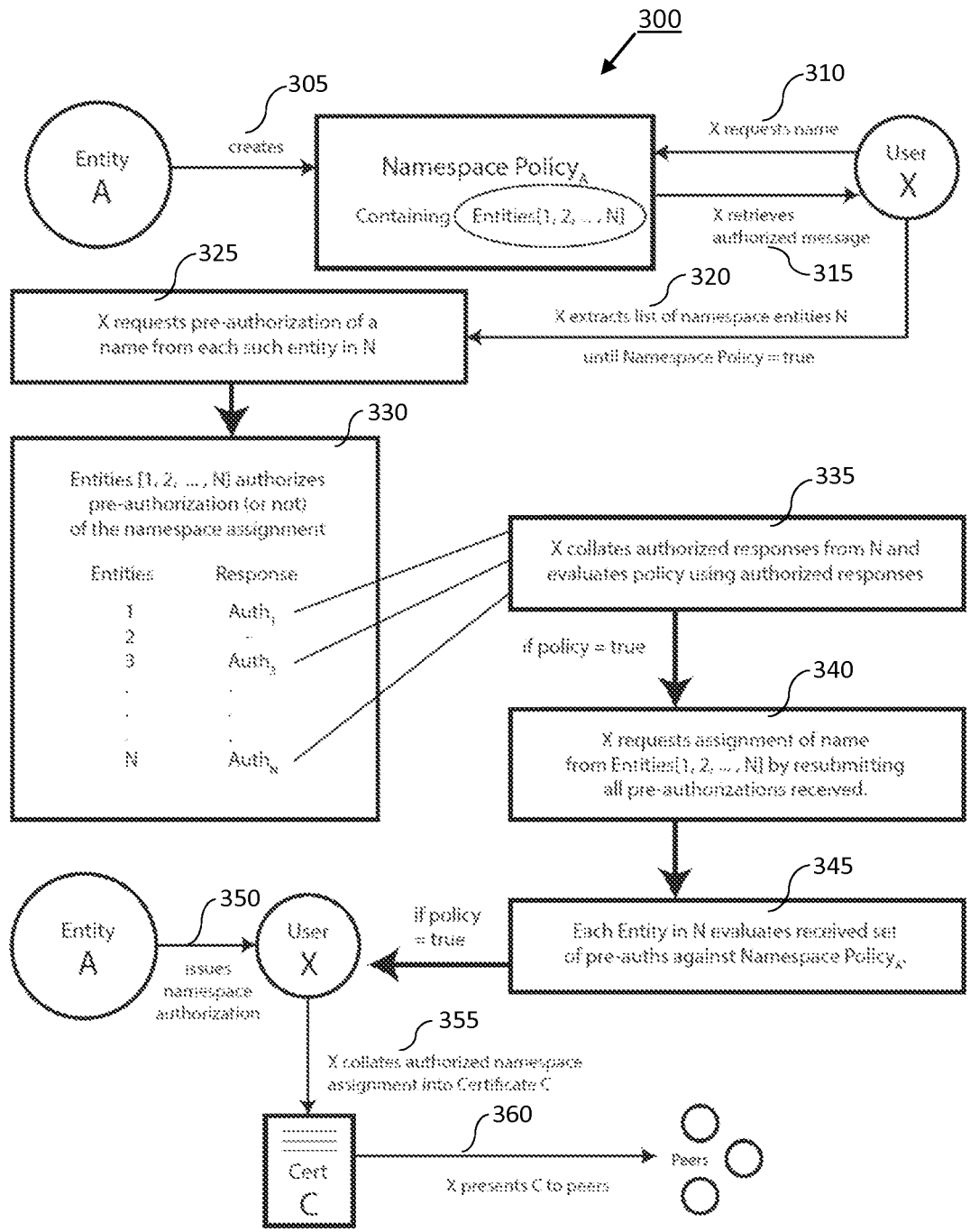
FIG. 3 illustrates a namespace assignment process according to an embodiment of the invention.

FIG. 3 illustrates a namespace assignment process 300 according to an embodiment of the invention. Entity A creates (step 305) a namespace policy containing N entities, who are Service Providers that provide namespace operation. User X requests (step 310) a name in namespace owned by A. User X retrieves (step 315) the authorized message containing namespace policy for A. User X extracts (step 320) a list of namespace entities N, needed to evaluate the namespace policy to true. User X requests (step 325) pre-authorization of a name from each such entity in N. Each entity in N authorizes (step 330) the pre-authorization (or not) of the namespace assignment. User X collates (step 335) the authorized responses from N, and evaluates the policy using the authorized responses. If the policy evaluates to true, X requests (step 340) assignment of the name from all entities in N by resubmitting all pre-authorizations received. Each Entity in N evaluates (step 345) the received set of pre-authorizations against the namespace policy. If the policy evaluates to true, the entity issues (step 350) a namespace authorization to X. X collates (step 355) the authorized namespace assignment into certificate C, which consists of all signatures of authorizing N and the namespace datum which, in some implementations, is the datum signed against. X presents (step 360) C to peers, who can prove via the signed authorizations of N that X owns the newly issued name when matched against the namespace policy for A. In one implementation, X is assigned a name by N based on a hash of the key, datum, or identity information presented to N. In another implementation, X does not receive pre-authorizations. Instead, members of N assign the name. This may allow names to be rendered unusable in the system as members of N typically do not retract authorization of names once issued.

Control Service Providers:

In one embodiment, entities may want to replace traditional PPK certificates for use in authentication and authorization with a policy-based approach. This approach has multiple benefits including more resilient execution of entity actions, safety, distribution of authority, and other concerns. Control Policies are policies that fulfill general authentication, authorization, and executive needs. In some implementations control policies are used when another more specific policy does not exist. In some implementations control policies are used to authorize replacement of certain types of policies. In one embodiment, control policies are used to replace other policies that are transient or fast changing, or to execute the entity's will directly.

Figure 4:
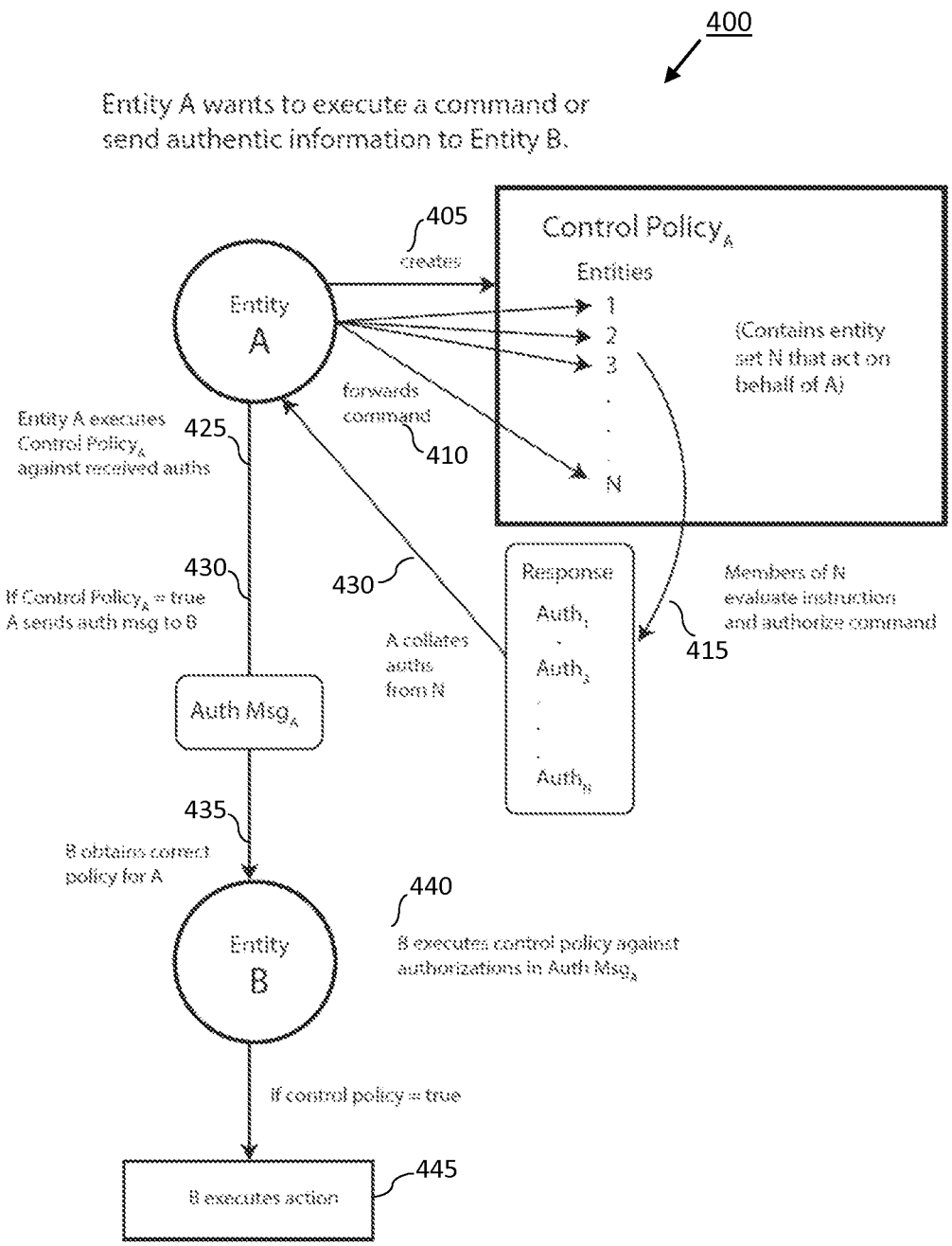
FIG. 4 illustrates a process for using a control policy according to an embodiment of the invention.

FIG. 4 illustrates a process 400 for using a control policy according to an embodiment of the invention. Entity A creates (step 405) a control policy containing entity set N who will act on behalf of A. Entity A wants to execute a command or send authentic information to entity B. Entity A forwards (step 410) the command to each member of N. In some implementations, this may be a subset of members of N. Members of N evaluate (step 415) the instruction and authorize at their discretion the command. Entity A collates (step 420) the authorizations received from N. Entity A executes (step 425) the control policy against the received authorizations. If the control policy evaluates to true, Entity A sends (step 430) the authorized message to entity B. Entity B must know the command is authentic. Entity B obtains (step 435) the correct control policy for A. In some implementations, the policy exists in entity As credentials. In some implementations, the control policy exists in another message. Entity B executes (step 440) the control policy against the authorizations in the authorized message sent from A. If the control policy evaluates to true, B executes (step 445) the action dictated.

In one embodiment, A simply forwards authorizations to B as they are received, and B collates authorizations until the control policy evaluates to true. In one implementation, B holds authorizations as long as the control policy evaluates to false, or until a certain time has passed, after which time the command and current authorizations are discarded.

In some implementations, control policies are not used, and other more specific policy contexts are used to authenticate specific action. For instance, a verinym may authenticate routed traffic through a route policy. Peers would authenticate routed traffic directly against this policy instead of the control policy.

Ownership Service Providers:

In some implementations, centralized PM management of identities is not desirable due to cost, complexity, and other issues. Indeed, much of the benefits of embodiments of ENT systems stem from their ability to remove these costs, centralization, and complexity. The need for identity management arises at two critical points in an identity lifespan. First it arises when an identity is created. Secondly, and more intractably, it occurs when an identity needs to be renewed due to loss, compromise, or expiry. More specifically, it arises when the cryptographic primitives associated with an identity need to be renewed or replaced, or disabled due to loss or theft.

In some implementations, ownership service providers present a generalized version of the renewal processes found in ENT systems. Entity owners may set up a policy that allows them to designate peer entities as trusted renewal sources once those entities have received a valid identity in the system. In some implementations, multiple policies containing multiple sets of ownership service providers are used. In one embodiment, these multiple policies have a hierarchy such that one policy may override another.

In some implementations, ownership policies are executed and if the result is true, a renewal of the entity is authorized. Authorized renewal may mean new credentials or certificates replace the existing credentials identifying the entity.

In some implementations, ownership policies are used to change policies associated with an entity. In one embodiment, it is useful to execute an ownership policy to replace a control policy. Control policies cannot replace themselves because that would allow an attacker with access to the cryptographic primitives associated with that control policy to gain permanent control of the identity. Instead it is beneficial to have a separate set of peers who have been entrusted specifically with the task of performing authentication of the user before replacing user credentials.

In some implementations, namespace policies may have higher precedence than ownership policies. Ownership policies may have higher precedence than control policies. In some implementations, ownership policies may replace ownership policies, control policies, namespace policies or any other type of policy associated with an entity.

Figure 5:
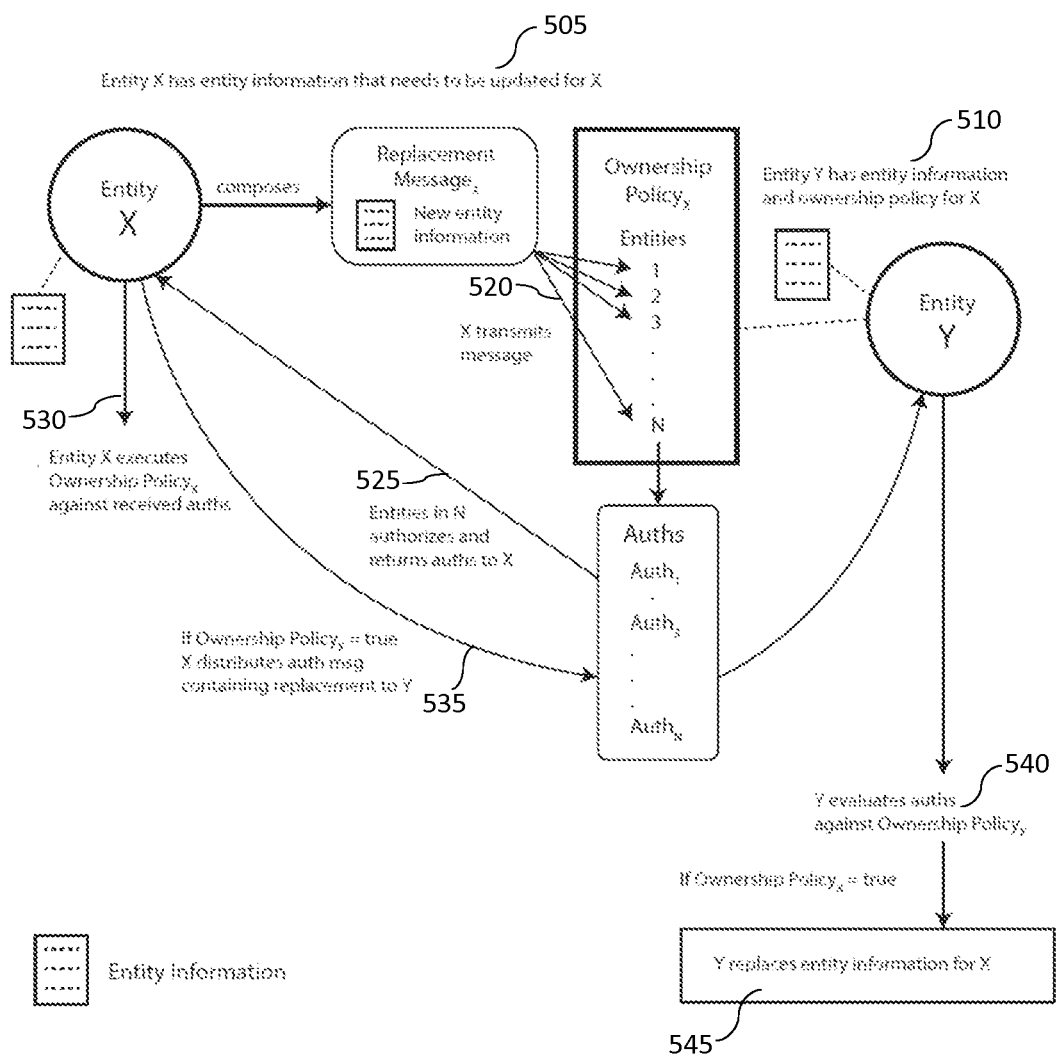
FIG. 5 illustrates a process for using an ownership policy according to an embodiment of the invention.

FIG. 5 illustrates a process 500 for using an ownership policy according to an embodiment of the invention. Here, Entity X has (step 505) entity information that needs to be updated for X. Entity Y has (step 510) the entity information and the ownership policy for X, containing a set of N entities present in the ownership policy. Entity X composes (step 515) a replacement message containing new entity information that may include new control, ownership, or other policies. Entity X transmits (step 520) this message to entities in N. Entities in N authorize (step 525), at their discretion, the message from X, and return their authorizations to X. X collates all authorizations, and executes (step 530) the ownership policy against those authorizations. If the policy evaluates to true, X can now distribute (step 535) the authorized message containing the replacement to peer Y. Y evaluates (step 540) the authorizations of N against its current ownership policy of X. If the policy evaluates to true, Y replaces (step 545) their previous entity information for X with the newly authorized entity information. The new entity information for X is now in effect at Y.

In some implementations, a change to the ownership policy portion of an entity's information may require an escrow process, as described earlier. In some implementations, this escrow period may be very short or non-existent when an entity is first credentialed in order to allow initial changes to the entity information to occur rapidly. In some implementations, when an escrow is used, entity Y may hold the replacement entity credentials until the escrow period expires, at which time they replace X's old entity information with the new entity information.

Resolution, Proxy, and Router Service Providers:

In some implementations, entities may change their computer network location when mobility is needed. It is generally useful to employ mechanisms that allow one entity to determine a network location of another entity. In addition, entities may not be directly accessible on the network for security reasons. In one implementation, a resolution policy contains network addresses or peer entities that are the destination to which communication should be sent, providing direct routing and proxy services. In another implementation, the resolution policy may contain peer entities or network locations that should be queried to receive the entity's current location. Resolution service providers can thus provide services such as proxy or forwarder service to an entity, and allow ephemerally located entities to have static or semi-static addresses through which peers can reach them.

In one implementation, a resolution policy consists of a simple OR statement and any number of entities. The semantic meaning of OR, in one implementation, may constitute an ordered resolution order. That is, each entity is contacted in the order in which it appears. If the first entity is unreachable, the next in the list may be contacted, and so on.

In one implementation, a resolution policy's semantic meaning of AND constitutes a "blanket" approach to contact. In this case each entity in the AND statement is tried simultaneously, and the first reachable host is used as the resolved location. Alternately, all hosts may be used as destinations for generated communication. In one implementation, both AND and OR functions may be combined in a single policy. One skilled in the art will recognize the various permutations possible with such an approach.

In one embodiment, the policy semantic of ONE_OF may constitute contacting a single random entity in the statement. If contact fails, another random entity may be tried. This is useful for load balancing and round robin treatment of incoming traffic.

In one implementation, existing network and standards-based identifiers can be used in resolution policies as implicit entities. IP addresses and DNS addresses, as two examples, are candidates for this type of treatment. This allows traditional network identifiers to be interleaved with entity identities.

In some implementations, entities may implement recursion on resolution policies. That is, a resolution to an entity X may thereafter invoke resolution of entity X's resolution policy. This recursion may continue until a loop is found or a fundamental implicit entity such as DNS and IP address (as examples) are discovered.

In some implementations, resolution policies may be held privately by Resolution service providers, or released contextually to peer entities. This allows contextual knowledge to be held by the entity most specifically situated. For instance, an entity may need knowledge of another entity's location in a local area network setting. A resolution service provider outside of that setting may not know or care that the resolution policy presented inside that context is different than the policy presented in the inter network environment. In typical implementations, policies released to select peers contextually are held in authorized messages, and not the core credentials for the entity.

Notification Service Providers:

Activity related to a verinym may necessitate notification of an owner, controller or other party. For example, a verinym that needs a credential renewal may need to notify its owner of that need. In another example, a network service may want to give clients or users of that service a mechanism through which they can notify the service owner that the service is malfunctioning due to network outage, content delivery network (CDN) failure or other problem.

Notifications are critical in ENT systems. Certain types of transactions must be brought to the owner's or notified parties' attention. In the case of an ownership change or renewal, an attacker may be able to gain permanent ownership of a verinym after an escrow period if the proper user is not notified and does not know they need to act to protect themselves.

In one embodiment, notification service providers fulfill this need. Through declaration of a notification policy, a verinym can publish a mechanism by which owners or notification parties can be notified in the event of activity related to that verinym. In one embodiment, a successful execution of a notification policy establishes that the proper parties were notified of the event. In the case where notification of parties was not successful, one implementation may dictate that the notification should be reattempted.

In one embodiment, operator OR in a notification policy may designate that any entities in the policy, if notified, may be used as inputs to the policy execution. For example, a policy "OR(A,B)" would be satisfied if verinym A or B were notified by the entity using the policy.

In one embodiment, operator AND in a notification policy may designate that all entities in the AND statement must be notified. For example, policy "AND(A,B,C)" would designate that all of A, B and C must be notified when necessary. The entity would then attempt to notify each party until the notification policy was executed successfully.

In one embodiment, an escrow may be associated with the policy. This escrow period may designate how long until a party should not attempt notification. In typical implementations, this is the length of the escrow period associated with the ownership policy.

In one embodiment, multiple notification policies may be set, and may apply to different uses of the verinym. For example, one notification policy may exist for changes or updates to the ownership policy, while another may be used for verinym status updates, such as embodiment or virtualization events.

In one embodiment, notification policies may be implicit, and defined as a policy "AND(A,B)" where A is the ownership policy and B is the control policy.

In one embodiment, notification policies may be recursed such using composition techniques used in control policies, and verinym composition. For example, a policy "AND(A, B)" may direct notification of A, where A is a group of verinyms C, D, and E. In this case the notification policy would direct notification of verinyms B, C, D, and E.

In typical embodiments, a notification policy that is masked, that is, where only the policy hash is known, may be used to limit notifications. It is probable that unmasked notification policies would allow unknown verinyms to send bogus notifications to the entities in a notification policy. It should be noted that utilization of a verinym contact list may limit this type of unwanted communication to known parties only.

Storage Service Providers:

In digital systems, data storage, protection of data, and distribution of data are all important topics. Many data systems, such as a redundant array of independent disks (RAID), clusters, and databases rely on two concepts: data segmentation and data duplication. Data segmentation can be found in systems such as RAID striping and Bittorrent distribution. The basis behind segmentation is to break up a large data set into segments for increased bandwidth utilization to many targets, and for faster access to data units. RAID, for example, utilizes striping to increase the read times of multiple drives, reducing the physical cost of hard-drive seeks. Bittorrent implements technologies that allow a larger number of peers to share the load of accessing very large files over relatively slow network uplink connections by accessing segments of those files from many sources.

Data duplication is vital for protection of data sets. It is common for hard drives to fail, accidents to occur causing data to become corrupted. RAID replication, and wide distribution of data parts in Bittorrent are two mechanisms by which data duplication can prevent data corruption.

In some implementations, storage service providers are providers of data storage facilities to entities. Storage providers can offer a variety of services such as load balanced repositories, data duplication to protect from loss, and data revisions for damage restoration/mitigation. In simple implementations, storage policies may contain storage service provider entities or network locations. In more typical implementations, storage service providers are entities that have their own credentials, policies, and configurations. In some implementations, storage service providers utilize policy evaluation to determine a complete combination of data parts to reconstruct a complete user data object. In some implementations the operators in a policy are defined to have semantic meaning in regards to data segmentation and data duplication.

In one embodiment of the invention, the logical AND operator may denote a data segmentation strategy, where each entity within the AND operator designates the holder of a partition/part of the entity's data. For example, a policy of "AND(A,B,C,D)" would denote that the entity's data is stored in non-overlapping parts across entities A, B, C, and D. Further, each of these entities would store only one quarter of the entity's data.

In one embodiment, the logical OR operator may denote a data duplication strategy, where each entity within the OR operator designates a holder of the complete data for an entity. For example, a policy of "OR(A,B,C,D)" may denote that the entity's complete data can be retrieved from any of A, B, C or D.

In one embodiment, the logical XOF operator may denote a combination of OR and AND strategies. For example, a policy of "XOF(3,A,B,C,D,E,F)", wherein the 3 is the number of entities needed, and the letters represent entities, would allow an entity's data to be reconstructed from any three of the six entities in the policy.

In one embodiment, evaluation of a storage policy to true, when evaluated against network-reachable/online storage service providers would denote that enough storage providers are contactable to reconstruct an entire datum. For example, a policy of "OR(A,E,AND(B,C,D))" would evaluate to true if A or E were online, or if B,C, and D were online, etc.

In one embodiment, a policy context for storage with multiple policies could provide data duplication service. For example, if each policy contained only one entity, the entity data could be retrieved from any entity in any policy. In some implementations, this is equivalent to combining all policies into a single policy joined using the OR operator described above.

Credential Service Providers:

In traditional PKI systems, certificate repositories exist that the system can query for information about credential status. Typically these repositories are centralized and centrally controlled by the system. When an entity wishes to respond to initiation of a peer connection, traditional systems may query this central repository to ensure the peer has a valid credential. It is required that these repositories have information that is up to date and is not compromised. For large systems, these repositories can become bottlenecks in terms of the number of queries they can service, and central points of attack or failure. Further they are costly and have substantial uptime requirements.

In some implementations, centralized repositories of certificates may not be feasible. In some implementations, a credential service provider can be used to fulfill the duties of a credential repository at the direction of specific entities through use of policies. In typical implementations, credential context policies may only be altered by an ownership policy.

In one implementation, credential service providers who have agreed on a certificate's standing may be inputs into the evaluation of a policy. An evaluation of true would allow the transaction to continue, whereas a result of false would signify that the credential check failed, and the transaction should be halted.

Figure 6:
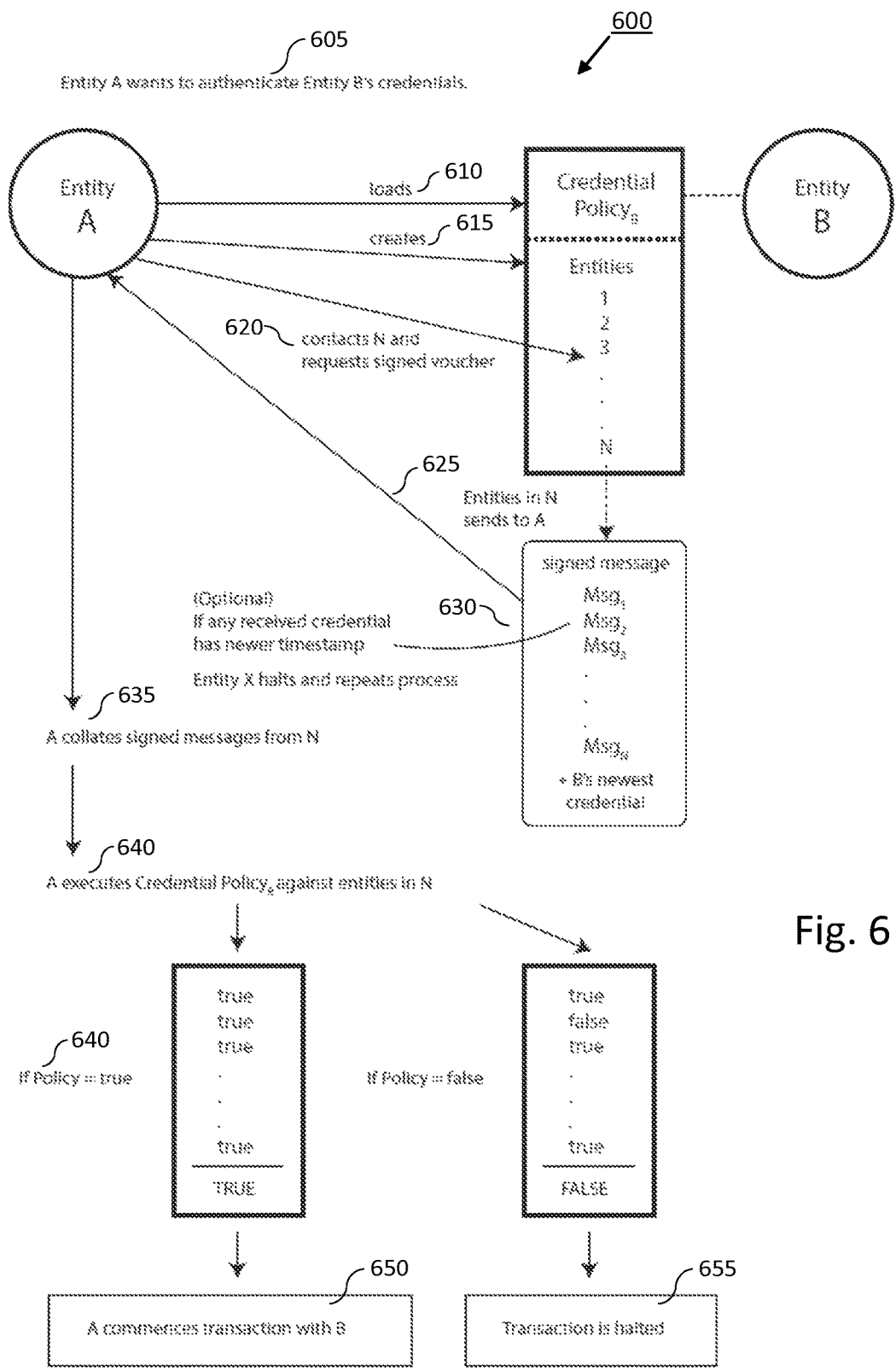
FIG. 6 illustrates a process implemented by a credential service provider according to an embodiment of the invention.

FIG. 6 illustrates a process 600 implemented by a credential service provider according to an embodiment of the invention. Entity A wants (step 605) to retrieve/match the credentials presented to it for entity B prior to allowing B to authenticate, and ensure those credentials are accurate. Entity A loads (step 610) the policy associated with the credential context for B. Entity A creates (step 615) a set N of entities found in the policy. Entity A contacts (step 620) entities found in N and requests a signed voucher that the credential presented is the most correct version. Entities in N send (step 625) a signed message, containing their newest credential for B, to Entity A. If any received valid credential from N has a newer timestamp than that presented to A, A halts (step 630) this process and begins again with the newest credential presented. Entity A collates (step 635) all signed messages from N. Entity A executes (step 640) credential policy for B against entities in N, substituting each entity in the policy with a value of "true" if that entity sent an signed message to A containing a matched credential. If the policy evaluates (step 645) to true, A commences (step 650) the transaction with B. Otherwise the transaction is halted (step 655). In some implementations, step 630 is omitted.

In some implementations, another mechanism for determining the most valid credential is used instead of the credential timestamp. In one implementation this procedure is accomplished only when entities A and B have never communicated. This is more efficient than a check each time, and using other techniques, such as validity promulgation, A and B can ensure that the credentials are accurate. In one implementation, entity B always notifies peer entities when its credentials change.

Verinym Swaps:

It may be useful to view verinyms as digital properties. In this context, ownership policies act as digital property deeds, control policies act as the "keys" for use of the property, and the verinym name is the property address. Exchange of property is an important activity, and a core requirement for meaningful agreements. For instance, money is one form of property that may be exchanged, through contract, for other forms of property.

In one embodiment, verinyms in an ENT system may be swapped. In a typical embodiment, this swap should be atomic. That is, it should happen completely or not happen at all. This prevents one party from retaining rights to their digital goods while the counter-party has simultaneously given up rights. Atomicity ensures that the transaction is always fair, and that it completes successfully or does not complete at all.

Figure 7:
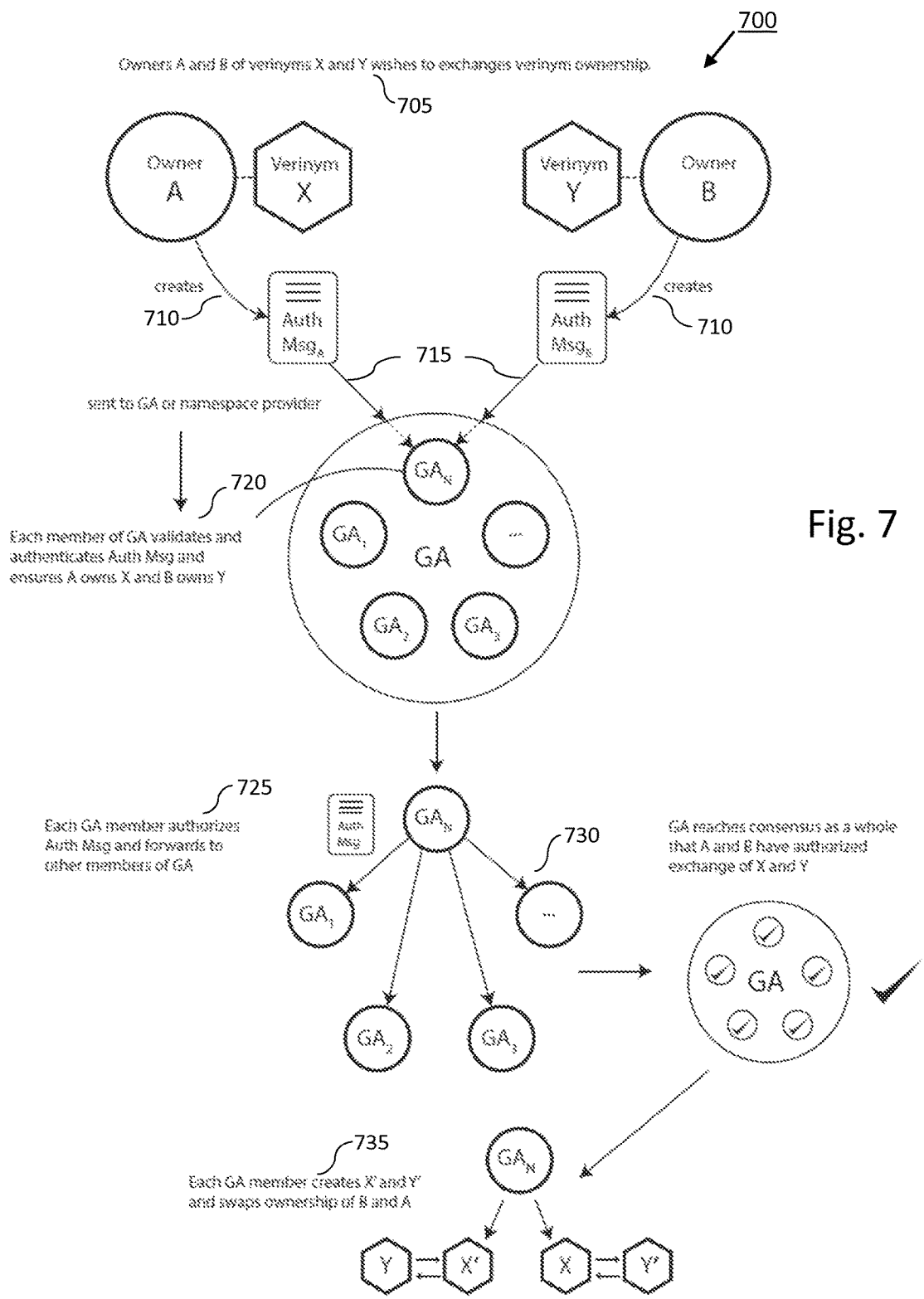
FIG. 7 illustrates an atomic swap process according to an embodiment of the invention.

FIG. 7 illustrates an atomic swap process 700 according to an embodiment of the invention. Here, respective owners A and B of verinyms X and Y wish (step 705) to exchange verinym ownership. That is A wants to own Y, and B wishes to own X. A and B both create (step 710) authorized messages with contents that show that A wishes to exchange X for Y, and B wishes to exchange Y for X. In one implementation, both of these authorized messages are identical in their contents. That is, the data in the message for A matches the data in message from B. This assumes that B and A have agreed on the message content form in advance. In one implementation, the message would have two parties, where the first party in the message is the lexicographically ordered name of A was placed first, and B placed second. This may be repeated for any data in the message. These authorized messages are sent (step 715) to the ENT system GA, or namespace service providers, depending on implementation. Each member of that group authority validates (step 720) and authenticates the authorized messages and check to ensure that A owns X and B owns Y. Each member in the GA authorizes (step 725) the message received from A and B, and forwards this authorized message to each other member of the GA. Once the GA reaches consensus in a quorum, the GA has determined (step 730) as a whole that A and B have authorized exchange of verinyms X and Y. Each member of the GA creates (step 735) new credentials X' and Y' reflecting the ownership of B and A respectively, by swapping the ownership policies of X into Y and Y into X'. In some implementations, other policies can also be swapped, including control policies, namespace policies, etc.

In one implementation, it may be useful to disable the ability of X and Y to act during the escrow period, except to cancel the escrow. In one embodiment, the GA may, at the start of escrow, issue new credentials for X and Y, X" and Y" respectively, that contain control policies that are inoperable. In one implementation, X" and Y" cannot modify their state data because they cannot create authorized messages. In one implementation, the GA may restore X" to X and Y" to Y if the escrow is canceled. In one implementation, if the escrow is completed, X" and Y" are discarded, and X' and Y' are used.

In one implementation, if a generalized ENT (GENT) system is used, predefined witnesses, such as credential service providers listed in credential policies are used instead of a GA. WA is defined as the credential policy for A, and WB is defined as the credential policy for B. In this embodiment, the GA is replaced with a policy containing credential service providers for A that must agree with the determination of a policy containing credential service providers for B, through dual evaluation of both policies. In one implementation, a new policy is formed for this transaction consisting of "AND(WA,WB)", which would evaluate to true if the credential service providers for A and the credential service providers for B agree. When in agreement, all providers authorize two new sets of credentials X' and Y' containing swapped policies, as listed above.

Generalized Entity Network Translation (GENT):

Using the concepts of Group Command and Control and Relational Authorization, we can implement very strong control and ownership for entities, respectively. A control policy dictates how an entity will authenticate or authorize action. An ownership policy, conversely, is used to renew the control policy for an entity, or make other changes to characteristics of that entity, such as renewal of credentials.

GENT uses these basic building blocks to create strong authentic relationships between parties that can withstand credential boundaries without sacrificing authenticity and without needing any hierarchical namespace system.

In ENT, every entity has a well-known static identifier. These identifiers are assigned arbitrarily either by a Group Authority (GA) or one or more namespace service providers. The trust that these identifiers are owned by their respective ownership policies is inherent in the GA structure. It is the system-wide trust in the issuing GA that ensures that identities issued by the GA structure are authentic. If the GA decided to reissue the same identifiers multiple times and to multiple parties the authenticity of the system is destroyed, as duplicated entities can spoof each other. To elaborate, it is the axiomatic authority of the GA that allows arbitrary naming, and arbitrary naming is the bedrock of ENT. ENT systems fully rely on the GA to never reissue the same identifier to two distinct entities. Further, ENT systems rely on the GA to only change credentials associated with an identifier if the relational authorization for ownership of that identifier is met through successful execution of the ownership policy. ENT authenticity crumbles if a GA reissues an identity outside of these ownership rules.

GENT approaches this problem from the novel perspective of separating persistent identity from authenticity. That is, identity may change, but authenticity should not. One skilled in the art will realize that this seems counter-intuitive if not immediately unworkable. Authenticity is specifically an identification action. However, the solution is in the term "persistent." GENT eliminates the GA structure by eliminating persistent identity. The important distinction is that GENT preserves instantaneous identity.

Instantaneous is exemplified by the following. Define parties A and B as peers in a relationship. A and B have both created ownership policies previous to their engagement. During initial engagement A and B exchange identity datum. An identity datum, in typical implementations, contains one or more ownership policies, or hashes thereof, one or more control policies, or hashes thereof, optional public key information, and other information desired by the parties. In some implementations, this identity datum is signed. In some implementations this datum is identical to an ENT authorized message, but may omit a static identity.

In one embodiment, the datum may be hashed using a secure hash to produce a unique value. This value may be used as the instantaneous identity of an entity. In one embodiment the hash is present in a certificate.

Depending on embodiment, exchange of instantaneous identity may consist of data drives, scanned barcodes, manually entry, or computer network communication between parties. These ownership policy hashes may be exchanged between A and B in any fashion such that A and B can synchronize.

These instantaneous identities form the axiomatic definition by which A and B will know each other at the initial instant of their relationship. If the parties failed to exchange data correctly, or if an attacker injected incorrect data into the initial setup, the parties will be denied from authenticating or interacting with each other because this axiomatic definition will be inaccurate. That is, the identity data for A or B will be wrong. However, because a secure hash is used, it is not possible for an attacker to spoof an identity datum that would hash to the same value exchanged by the parties. This prevents an attacker from spoofing either party during a transaction, or during initial exchange. To elaborate, if A wishes to authenticate with B, B must have the control policy of A and also As public key, whose hash is present in the control policy. The containing datum, when hashed with a secure hash algorithm has only an infinitesimal chance of colliding with the hash of another datum. Since a control policy often contains a public key hash, only a key corresponding to that hash can be used to authentically evaluate the control policy to true.

In one embodiment, policies in GENT systems contain entity identities that are instantaneous identities defined as the secure hash of an identity datum. This is more efficient than including the whole identity datum for each entity in a policy.

It may be useful for A and B to locally identify the other party by assigning a convenience name to the exchanged ownership policy hash. For instance, party B may assign "Alice" as a well-known name for the hash received from party A. Vice versa, A may assign "Bob" as the local name for the credential received and representative of party B. Otherwise both parties must rely on recognizing and interacting with the ownership policy hash which may be overly complex. For example, one party's hash would likely appear as a randomized character string of length 30 or more and would be difficult to work with. Note that these name representations are strictly local, and for the benefit of the user. No other entity, party or peer need recognize the assigned name. For instance, party C entering into a relationship with parties A and B could be known as "Charlie" to party A and to "Charice" to party B. In essence, 3rd parties may assign to a credential a pseudonym for use by that 3rd party alone.

In one embodiment, A and B communicate, take action, and authenticate using the general techniques available to ENT systems. That is, they may authenticate or authorize actions based on execution of control policies or other policies/data found in their respective identity data objects.

In ENT, credential boundaries occur when an identity datum must be updated for some reason. Typical reasons are loss of a private key used in a control policy, modification of an ownership policy or modification of other data in an identity datum. In some implementations, ENT systems handle credential boundaries by running a renewal procedure, which often includes evaluation of an ownership policy by a GA.

GENT does not have access to implicitly trusted GAs however, and the problem of strong identity continuity across credential boundaries without centralized trust or roots has been considered an intractable problem. However, using a novel mechanism GENT can provide strong continuity of existing relationships without need of centralized trust, assuming that no harm comes from changing the instantaneous identity of the modified party as the identity datum changes.

Figure 8:
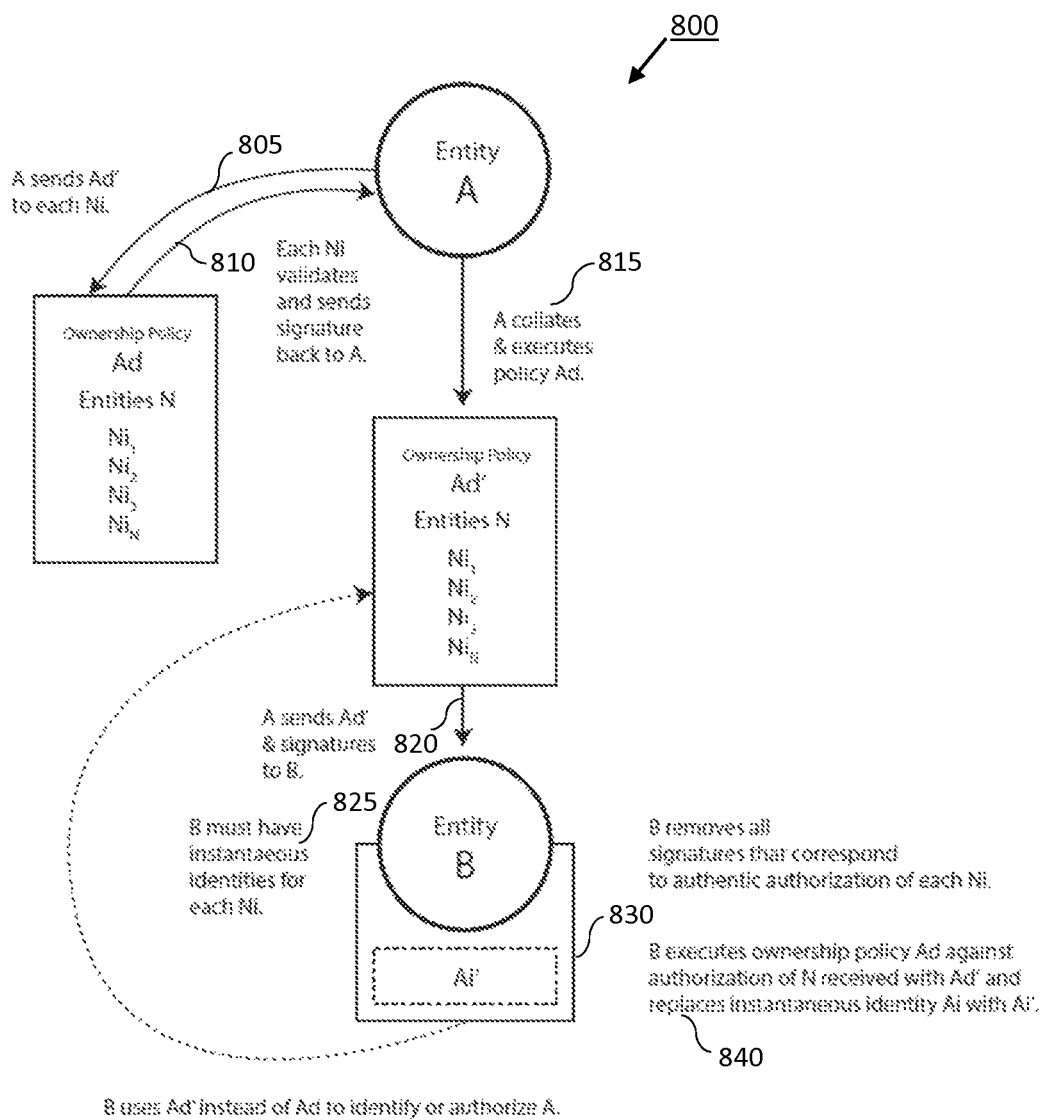
FIG. 8 illustrates an instantaneous identity process according to an embodiment of the invention.

FIG. 8 illustrates an instantaneous identity process 800 according to an embodiment of the invention. Let Entity A be an entity with instantaneous identity Ai reflecting identity datum Ad such that HASH(Ad)=Ai where HASH is a cryptographically secure hash algorithm. Let N represent a set of entities present in the ownership policy of A, such that the authorized renewal of A by each member of N would allow the ownership policy in Ad to evaluate to true. Define Ni as a member of N with identity datum Nid, and instantaneous identity Nii. Define Ad' as the identity datum used to replace Ad, and Ai' as the corresponding instantaneous identity for Ad'. Let B be another entity that has a relationship with A and has Ai.

Entity A sends (step 805) Ad' to each Ni. Each Ni validates (step 810) the data and either signs (or authorizes via their control policy) Ad', or denies authorization to the change. Each Ni then sends this signature or set of signatures back to A. A collates (step 815) all responses from N, and executes the ownership policy in Ad against these signatures, replacing each entity in the policy with a value of "true", if that entity has a valid signature for Ad'. If the policy evaluates to true, A can now send (step 820) Ad' and the signatures to B. B must have (step 825) instantaneous identities for each Ni. A may send these along with Ad' or B may retrieve through another mechanism. B must assure itself that the identity datum for each Ni corresponds to the instantaneous identity of Ni listed in the ownership policy of A. In typical implementations, this can be deduced to be true if a secure hash is used. B removes (step 830) all signatures from Ad' that do correspond to authentic authorization of a member of N. B executes (step 835) the ownership policy in Ad against the signatures (authorizations of N) received with Ad'. If the ownership policy evaluates to true, B replaces the instantaneous identity Ai with Ai', and replaces all use of Ai with Ai' internally. B uses (step 840) Ad' instead of Ad thereafter to authorize and identify A.

In typical implementations, this procedure is very similar to the renewal procedure used in ENT systems. However, there are a few important differences. First, each policy contains instantaneous identities Nii instead of well-known static identities. Second, B must have each instantaneous identity of Ni, but cannot be assured that those identities are still valid. It is possible that Ni has changed its identity datum since Ad was created. In this case, Ad contains Nii instead of Nii'. Perhaps the keys needed to evaluate Ni's control policy to true are now held by an attacker.

In some implementations, B may validate Nii against a certificate authority or a credential service provider. This assures B that Nii has not changed to Nii'. In some implementations, A may also present any Nii' certificates to B. It is in A's best interest to ensure that B always has any Nid' datum as soon as it is detected by A. Further if B does not have Nid', and Ad' is authorized by Nid', then B may not be able to evaluate the ownership policy of A to true. This may occur if the private key or ability to authorize associated with Nid was lost.

In some implementations, if B has Nid and was presented with Nid', it would first run GENT1 against Nid'. In order to do this it would need the instantaneous identities present in the ownership policy of Nid. This presents a recursion scenario in which each presented Nii' identity requires that B calculate and validate the instantaneous name of Ni before calculating A. The result is that any changes to the instantaneous identities in the ownership policy for A requires B to evaluate the instantaneous identities of all Ni. If one of these Ni has a different instantaneous identity than that listed in A, this process must be repeated for that Ni. Therefore, B must evaluate the entire "ownership chain" of A if there are any changes in the instantaneous identities in that chain. This is only necessary if that ownership chain has inaccurate instantaneous identities.

In practice this is not overly concerning so long as ownership chains are relatively short. The number of additional "ownership nodes" that must be checked by B grows linearly to the number of overall ownership changes affecting the ownership policy of A. For example, if entity A has ownership policy "AND(Di,Ei)" and Di has become Di', then B will need to check the ownership of D. If the ownership policy of Dd was "AND(Xi,Yi)", then B would have to validate Dd' against the signatures of the control policy of X and Y prior to evaluating D's authorization of A. Ownership chains are bounded (limited in length) when the instantaneous identity found in an ownership policy is accurate.

In one implementation, we can use this understanding to shorten ownership chains proactively. In this case, each time an entity detects a change in the instantaneous identity of a member of its ownership policy, it should immediately attempt an update of its identity datum to reflect the change, and promulgate the replacement to peers using GENT1. Further, policies that implement OR operators may eliminate ownership chaining if the ownership policy can be evaluated to true without needing authorization from an entity whose instantaneous identity has changed. In practice we find that the total per-entity cost of utilizing GENT techniques for continuity is only slightly greater than for a typical ENT implementation. The larger cost is the loss of a stable, static, well-known namespace that entities can rely on. In some implementations, this may be worthwhile, as GENT allows fully distributed resilience. Damage is always localized, leaving the majority of the system intact.

Verinym State Data:

Verinyms are strongly identified digital entities in ENT systems. Real world entities interact with ENT systems using verinyms. Using novel techniques verinyms can be extended to gain important properties such as intrinsic data, execution state, and even motility to better reflect this understanding.

In existing implementations, verinyms do not manage state or data. Data associated with verinyms is limited to data within the verinym credentials such as policies, identity, signatures, creation time, etc. This type of data is called meta-data in common implementations and contains data about the verinym. This meta-data is not data within the direct control of the verinym, but defines things about the verinym that are important to the definition of the verinym. Meta-data is typically controlled by either the verinym's owning namespace or the ownership policy for that verinym. It would be useful if verinyms contained and managed state and important data, such as agreements entered into through use of their control policy, access control lists, and any data that controlling entities may wish to store.

In one embodiment, we introduce a state datum specific to each verinym. In one implementation, a verinym's state datum is protected via symmetric key cryptography. That is, it is encrypted. In some implementations, the holder of the private symmetric key is one or more entities listed in the ownership policy. In some implementations, the symmetric key is held by one or more storage service providers. In some implementations, the key is split into pieces, perhaps reflecting the split of an ownership policy. One skilled in the art will have knowledge of which algorithms, procedures and techniques are of benefit here.

Figure 9:
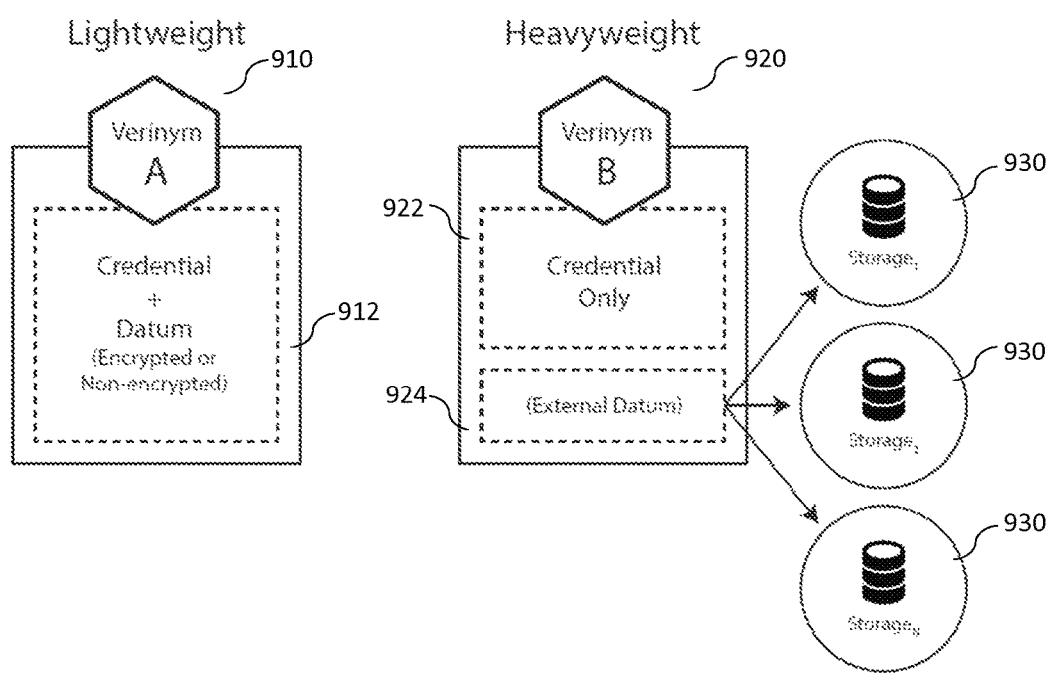
FIG. 9 illustrates two state datum forms of a verinym according to an embodiment of the invention.

In one embodiment, a verinym's state datum may take two forms, lightweight and heavyweight objects. Referring to FIG. 9, for lightweight data 910, the datum and the verinym credential are combined into a single signed object 912. This credential contains the data as well as the meta-data for a verinym. In some implementations, the datum is encrypted, disallowing non-authorized entities from knowing its contents. Lightweight verinyms are useful for describing individual data items, such as songs, documents, or data of small size. Note that in typical implementations of ENT, verinyms must be signed by a GA, and large amounts of state data for a lightweight verinym may be impractical because of GA processing and network communication requirements.

In the case of heavyweight data 920, the state datum may consist of a database, file system object, or datum. In this case, the heavyweight datum 924 may be stored separately in storage 930 from the credential 922 to allow rapid dissemination of the credential without duplication of the heavyweight datum. This is useful in situations where verinyms are used in multiple contexts, to describe highly complex groups of entities, or to manage large data objects. The core difference between lightweight and heavyweight verinyms, is that lightweight verinyms are held in a single signed credential or message, while heavyweight verinyms have one or more data components in addition to their credentials.

In one embodiment, storage service providers may use a single heavyweight verinym to store all of its data. This is useful as it allows a storage service provider to duplicate its data, and all of its constituent data, to other locations. In some cases this may grow a verinym (or it's state datum) used by the storage service provider to a very large size.

In some embodiments a verinym state datum, due to size, may need to use advanced techniques such as binary differential calculation in order to efficiently duplicate data changes to other locations in the network. That is, only the difference between the old and new datum may be distributed and stored.

In one embodiment, a verinym's state datum may represent any number of different types of information. Some examples include protocol description, JSON schemas, executable programs either compiled into machine language, or for interpreted languages such as java, music files, medical records, contact information, or any data desired by the verinym owner. Verinyms allow all of these data objects to be securely and authentically stored, accessed, and modified and have any level of data protection and distribution as needed via storage service providers.

Referring to FIG. 10, we extend the verinym such that each verinym may be in multiple different states, the virtual 1010, embodied 1020, locked 1030, and partially embodied states 1040. If a verinym is virtualized, its state datum is encrypted and inaccessible. Further, in some embodiments this state the verinym does not have private keys that are accessible for use. In some implementations, the private keys are part of the state datum, and are encrypted. In some implementations, the private keys are held by the verinyms (entities) in the ownership policy. That is, the owning verinyms of the verinym hold the private keys in their data stores. In some implementations, the private keys are held by storage service providers, access to which may be gated based on access control lists, locations in a network, or other similar methods. In typical implementations, virtualized verinyms are stored with various storage service providers according to a storage policy. Verinyms in a virtualized state are very strongly protected from theft or damage through encryption and offline keys, and their state datum is also inaccessible.

In one implementation, a second state of a verinym is the embodied state. If a verinym is embodied, there are private keys accessible to an entity that allows the verinym to authorize via its control policy. In some implementations, a control policy consists of multiple other verinyms, in which case a verinym is embodied if enough entities in the control policy are embodied that they, via authorized messages, may evaluate a control policy to true.

In one embodiment, verinyms can be embodied even if there is not sufficient quorum of a verinym's control policy to evaluate the control policy to true. In typical implementations, this is used in circumstances where the verinym's state datum is public, and the owner of the verinym wants that data to be publicly accessible. In one embodiment, the control policy of such a verinym is disabled, and may include updating the control policy to a well-known disabled state. In this case, the verinym may be embodied in multiple locations simultaneously, but is always incapable of action. Such verinyms are typically used when duplicated caching of public data is useful. Verinyms that are not capable of action, and whose state data are public are called locked verinyms. Locked verinyms, in essence, represent an authentic state and identity of a verinym, but cannot be changed and cannot take action. In one embodiment, locked verinyms are only ever updated through use of the ownership policy.

In one embodiment, verinyms are embodied only if their state datum is decrypted, and the verinym has an execution context. An execution context is a turing-complete computational device capable of executing instructions and updating a verinym state. In this case the state datum must be accessible to the execution context, and the verinym must be capable of executing signing and other action in this context. In one implementation, a verinym must be able to authorize action via its control policy, and also have an accessible state datum.

In one embodiment, verinyms may be embodied into execution contexts when authorized by the verinym owner. In one implementation, this is accomplished by creating an ownership policy authorized message containing a directive to embody a verinym at a specific execution context. For instance, if an ownership policy for C is "AND(A,B)", then an authorized message that commands the verinym C to be embodied on entity D (who has an execution context) must be signed/authorized by verinyms A and B. In one implementation, a storage service provider would use this authorized message to send to entity D the encrypted state datum for verinym C. In one implementation, entities A and B would send to D any necessary private keys that would allow D to decrypt the state datum for C. In one implementation, the private asymmetric keys for C would be in the state datum for C, in which case it would thereafter be embodied at D. In one implementation, A and B would hold one or more asymmetric keys for C, and all messages from C would need to first be send to A and B, where they would be authorized. In one implementation, the asymmetric keys for C would be sent to D such that D would be able to fully embody verinym C. Note that in the cases where D is receiving keys from A and B, D is trusted by A and B to establish an execution context for A. This implies that the execution context at D is trusted. In typical implementations, this would mean that A and B trust D implicitly to provide a safe execution context for C.

In one embodiment, verinyms may be virtualized (de-embodied) when authorized by the verinym owner. In one implementation, this is accomplished in the same way above, using the ownership policy of the verinym to notify D that an embodied verinym at D should be virtualized. In one implementation, D encrypts the state datum for C, and may use any number of methods to break up that shared secret for dissemination to A and B. In another implementation, D encrypts the state datum for C using the asymmetric keys of A and B if the control policies of A and B contain PPKs. This ensures that only A and B may decrypt C. In one implementation, D sends the encrypted state datum of C to the entities listed on the storage policy for C. In one implementation, D partitions the encrypted state datum of C and sends portions of that datum to the storage policy providers for C, as per one implementation of storage service providers. In one implementation, the encrypted datum is then deleted from D, along with any keys associated with C. One skilled in the art will recognize various embodiments capable of performing these tasks.

In one embodiment, a verinym C may represent a group of entities N where Nx is an x in N, each listed in the control policy of C. In this case, each Nx may want to decrypt and have access to the state datum for C. In one implementation, each Nx has keys sufficient to decrypt the state datum for C, and may load that datum into a local execution context for Nx. Nx can now partially embody C through authorized messages originating from C. In combination with other identical authorized messages from other verinyms in N, C can be embodied. The state in each execution context can be thought of as a partially embodied state of C. Where the partial embodiment of C occurs at each Nx. It is the combination of verinyms in N across execution contexts that fully embodies C.

In some implementations, Nx verinyms may need to coordinate such that the state datum of C does not become delusional. Data delusion occurs when a single logical datum, such as a state datum, becomes different in certain partially embodied locations but not in others. Using the voting mechanisms present in ENT techniques, we can ensure that data delusion does not occur. Each authorized message must include some number of Nx participants. In one implementation, where the control policy of C consists of a simple majority function of N, then each authorized message generated by C will have a majority of Nx participants whose authorizations match. This can be thought of as synchronization through quorum. That is, the members of C all vote on the state of C. In typical implementations, members that are not in agreement with the majority due to latency, network disconnect, or other issues will synchronize with the majority when any group authorized message is detected. In one embodiment, a vector clock is used by the majority, and incremented on each authorized update to the shared state. By communicating with other Nx in N, synchronization becomes straightforward. Members that are out of sync with the majority may resynchronize by requesting each incremental update in order. In typical implementations, members that are out of sync do not vote or provide input to new synchronization events until they are fully synchronized. In one embodiment, one Nx in N synchronizes the datum for N, and each other Nx only provides voting input to that Nx. That is, only one Nx holds and executes the state datum for N, and other Nx simply provide authorization.

In one embodiment, a verinym must always be fully embodied prior to use and only one embodiment of a verinym may ever exist. This has the benefit of never suffering from synchronization issues, as an embodied verinym is always singular. In some embodiments, the storage service provider may keep an internal state that locks a verinym state datum into a "checked out" condition when the verinym is embodied elsewhere. When the verinym is virtualized, a storage service provider receiving an updated version of its state datum will reset this internal state to reflect that the verinym is virtualized, or "checked in". This locking allows verinyms to be embodied only when they are not embodied elsewhere. In another embodiment, other more advanced synchronization techniques may be used, such as vector clocks or interval tree clocks, etc.

In one embodiment, control policies can be used instead, or in addition to ownership policies to allow virtualization or embodiment of a verinym. This is useful as it allows a verinym to virtualize and embody itself into a different execution context. For instance, a verinym whose state datum is a song may use this facility to move itself from execution context to execution context such that it is physically closer to the verinym owner. This would allow people to have music and files that followed them from device to device, town to town, or even across the world, assuming execution contexts exist at each location.

In general, verinyms are very private, and great care has been taken to eliminate information leakage associated with them. However, it is useful in some implementations to have verinyms that are highly public. For instance, a verinym that represents a well-known standard should be accessible by any entity. In these cases it is beneficial for a verinyms state datum to be easily accessed, but to be impossible for an attacker to forge. Further, we want the state datum to be widely distributed. For example, a well-known protocol schema can be identified with a verinym. It is beneficial for this protocol to be widely accessible, and so we may use a large number of storage service providers to duplicate the state datum so that it is easily accessed. Further, we want these storage service providers to present a decrypted version of the datum to entities.

In one embodiment, a verinym's state datum must be signed so as to prevent an attacker from inserting non-authentic information into the datum. In one embodiment, the state datum is made public if authorized by the owner. Note that the verinym state datum, even if widely distributed, does not constitute numerous embodiments of the verinym. Because a verinym consists of both its authorizing members or keys, and its state datum, it requires both of these to fulfill the embodiment requirements. In some implementations these can be locked verinyms. In other implementations, these can be accessible via the storage service providers used by the verinym.

In one embodiment, it is useful to have storage service providers that keep multiple versions of the state datum for a verinym. This allows verinyms that are compromised or lost, perhaps because of destruction or malfunction of their execution context, to be rewound to a previous state. For instance, if an attacker gains control of a verinym, that attacker may modify the state datum for the verinym. This may be used to spread viruses, damage data, or other malicious activity. Incorrect operation of an execution context may likewise cause data corruption of the state datum. Both of these issues can be prevented by allowing a verinym to be rewound to an earlier state at behest of the verinym owner. Likewise, this mechanism can be used to roll back transactions created by the verinym. In one implementation, the verinym's owner would issue authorized rollback message that would request all transactions with a verinym to be rewound. This rewind message would command each storage service provider to rewind its version of the state datum for a verinym to a previous temporal point as directed by the owner. This allows exceptional redundancy of a verinym when combined with other techniques such as use of multiple storage service providers for both data duplication and data segmentation. Indeed, using these techniques across even a dozen storage service providers would make most data largely indestructible to accidental or malicious harm.

Verinym Contact Lists:

In typical implementations, it is beneficial for verinyms to be able to filter out communications from unknown parties and identify parties prior to transacting. Indeed, most existing problems with viruses, and spam can be traced to unsolicited communication from bad actors in a system. Additionally, it is useful for verinyms to maintain a list of parties having relationships with the verinym. In the case of credential renewal, for instance, validity promulgation works only if the verinym has a known list of parties to which it can promulgate credential or policy changes.

In some implementations, verinyms maintain a contact list in their state datum. This list consists of all parties that are authorized to communicate and transact with the verinym. In effect, the contact list is a white-list of allowed transaction partners. In typical implementations this contact list is used during a credential renewal to allow the verinym to notify its transaction partners of the newly acquired credentials.

In typical implementations, the contacts may be added, removed or modified by the owner of the verinym. In one embodiment, contacts are added to a verinym through use of a message authorized by the ownership policy of a verinym.

In one embodiment, a contact list entry may allow additional information about the contact to be stored. Information such as a nickname, type of verinym, and notes are typical. In one implementation, a contact list entry for a peer may include policies that should be communicated or shared with that peer. For example, a user may wish a peer to have knowledge of their ownership policy in case their device is lost or stolen. This peer would then be capable of telling the user who or what is capable of helping the user re-establish ownership of a compromised or lost verinym. In one implementation, peers listed in an ownership policy may be implicitly authorized to have this information.

In one implementation, all messages received and processed for a verinym may be filtered based on the sender's inclusion in the contact list for that verinym. In one implementation, verinyms listed in any of the authentic policies for a verinym may be implicitly added to the verinym's contact list. In one implementation, group authorities or owners of the namespace in which a verinym was issued may be implicitly added to the contact list for that verinym. In one embodiment, only the GA as a whole, and not its comprising members may be implicitly added. That is, only authorized messages from the GA, and not authorized messages from constituent members of that GA may be processed, all others may be filtered out.

Contact lists provide users with intuitive filtering capabilities. If a peer is not in their contact list, that peer cannot communicate with the user.

ENT Nodes:

In many implementations, verinyms need an execution context in order to be embodied. In ENT systems such an execution context is called an ENT Node. ENT nodes are execution contexts that are homed in a computational device containing memory and storage sufficient to embody a verinym, either fully or partially and that can process requirements of an ENT system. In typical implementations, an ENT Node is itself defined by a verinym. This verinym is called a device verinym, and it represents the physicality of a machine's execution context. In typical implementations, a device verinym is embodied on the machine that it describes. The owner is typically the physical owner of the device, but this may vary depending on context. Device verinyms are therefore semi-fixed points in a typical ENT topology. In one implementation, they are the only execution contexts on which a verinym can be embodied.

In some implementations, device verinyms determine how verinyms are embodied in their execution contexts. In one implementation, this is accomplished through the device verinym's ownership policy. In some implementations, the device verinym may have specific criteria that it uses to allow embodiment of a verinym in its execution context without express authorization from its owner. In this case the verinym may use predefined rules, such as a policy execution, to allow embodiment. In other systems, the device verinym may use custom rules, or arbitrary execution of code to make this determination. As an example of one embodiment, a device verinym may allow all verinyms listed in its embodiment policy to be embodied in the context of that verinym.

In some implementations, a control policy may be used to authorize embodiment of a verinym in a device verinym's execution context. This is useful in implementations where device verinyms are commodity computing elements. For example, the device verinym's owner may purchase the device, and connect it to an ENT system. That owner may then lease access to the device by defining a control policy containing the lessee. The lessee may then control the device verinym directly, embodying verinyms at their discretion. In one embodiment, use of policy encumbrance principals makes this type of implementation fair to both the owner and lessee.

Note that ENT nodes are not necessarily the only programs running on the computational device. In many implementations, an ENT node is a program that executes in the context of an operating system. In some implementations, multiple ENT nodes may execute on the same computational device. This is useful if the device is designed to handle many parallel programs, such as current state-of-the-art servers. In some implementations, there may not be an underlying operating system, and the ENT node software itself may execute directly on the computer hardware.

Figure 11:
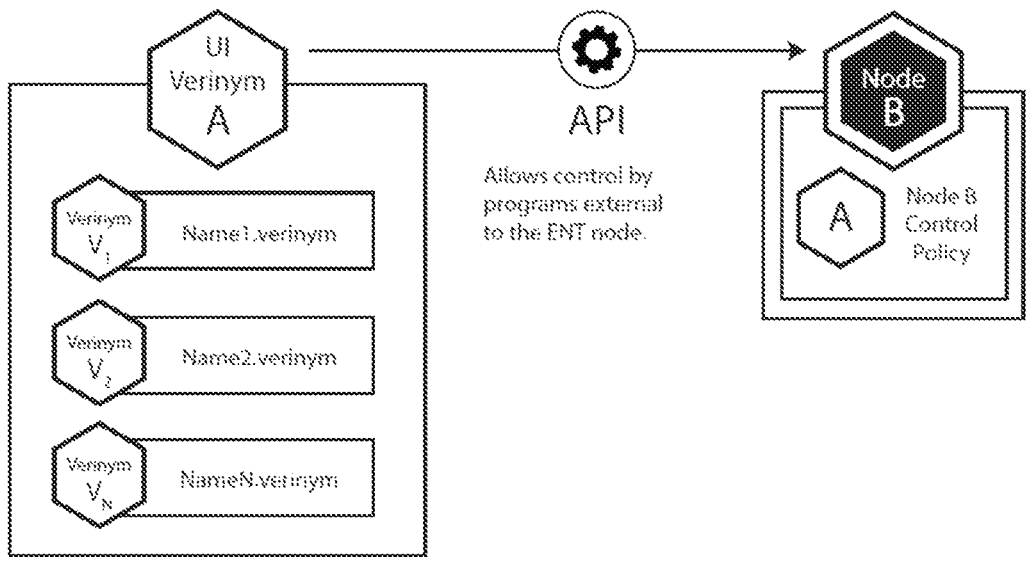
FIG. 11 illustrates control of an ENT node through a user interface according to an exemplary embodiment of the invention.
Figure 12:
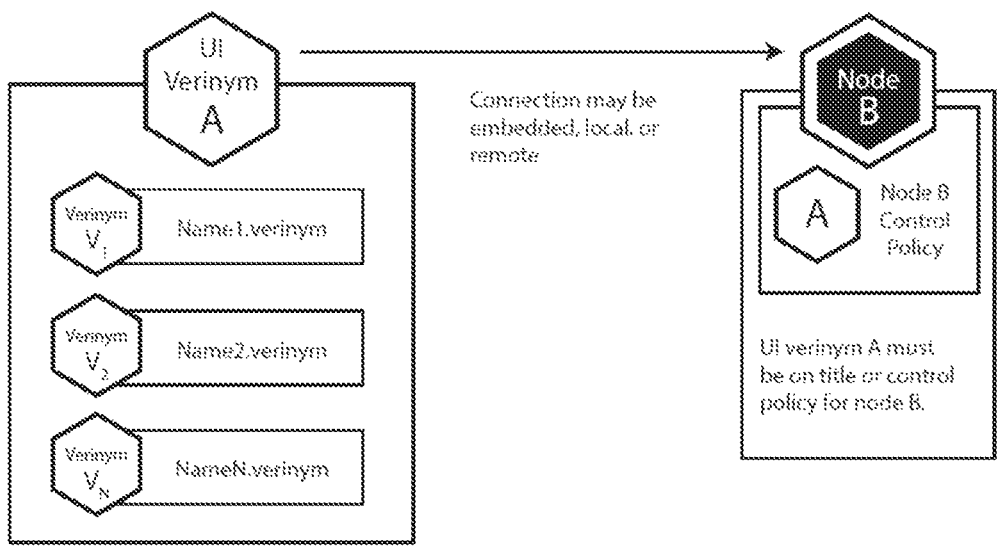
FIG. 12 illustrates control of an ENT node through a network according to an exemplary embodiment of the invention.

User Interfaces and ENT Context Verinyms:

In typical applications, the ENT node is controlled by the device owner or by its controller either directly, via a user interface (UI), or remotely via text or network commands. For example, FIG. 11 illustrates control through a user interface. In another example, FIG. 12 illustrates control through a network. In some implementations, programs external to an ENT Node may use a verinym that is embodied on that ENT node by connecting into the ENT node, via an application programming interface (API). In these cases, the ENT node may notify the user via the UI that an external application wants to use an embodied verinym. The user may then select programs that are allowed access to verinyms, and may also limit the specific verinyms to which these programs have access. For example, one application may want to use a verinym as a social network identity, another application may wish to use a verinym as a game data, etc. In one implementation, the ENT node may remember which combination of application to verinym the user chose, and re-establish future API connections from known applications to known verinyms. This allows the user to set a binding between applications and verinyms once, and have it be remembered. In some implementations these bindings may be stored in the state datum for the verinym. Note that this technique cleanly separates a program's need for context, and a user's need for ownership and control of data and identity. In some implementations, users may terminate bindings between a program and a verinym at any time. This allows the user to use a different program with the same data, or disable access to the user's information for privacy reasons, migration, etc. In essence, this paradigm allows users to fully own and control verinyms, while granting access to programs, vendors, or functionality that may benefit the user. In such systems, the user is clearly the one in control of their own data and identity, even if a program is allowed to use that data or identity.

In one implementation, ENT nodes may embody a type of verinym defined as an "ENT context". ENT context verinyms are verinyms that hold configuration data about other verinyms, such as contact lists, blacklisted verinyms, and peer verinyms. In some implementations, when an ENT context verinym is embodied into an ENT node, actions are performed. In one implementation, the actions performed may include embodiment of additional verinyms, based on information held in the ENT context state datum, and/or recursion of embodiment of additional ENT context verinyms listed in the ENT context state datum. Verinyms listed in an ENT context verinym are defined as nested verinyms. In some embodiments, actions may include decryption of private asymmetric or symmetric keys, automatically generated authorized messages used to update resolution service providers, notification to peers or current location, etc. In typical embodiments, ENT nodes may load only a single master context. This simplifies resource allocation done by the ENT node. In one embodiment, when an ENT context is virtualized, some actions may be performed. Actions may include virtualization of nested verinyms, or other actions, such as peer notification, closing connections, notification to resolution service providers, etc.

In typical implementations, ENT context verinyms are heavyweight verinyms. Further, in some implementations, all heavyweight verinyms are ENT context verinyms. That is, any heavyweight verinym may contain information about other verinyms or nested verinyms. In some implementations, nested verinyms may be owned and controlled by an ENT context via the ownership policy and control policy respectively. This has many advantages. Specifically, it greatly simplifies the management of large numbers of verinyms. Additionally, this provides strong compartmentalization between user verinyms that can protect privacy, limit attacker access, and establish strong control over information leakage. In some implementations, users may switch from one ENT context to another. This may update the UI to reflect only the selected ENT context and its nested verinyms. In some implementations, nested verinyms have no knowledge about the verinyms they are nested within. For instance, a verinym may not have stored in its state datum the ownership policy contained in its credentials. Likewise it may not have access to the control policy stored in its credentials. This is beneficial in that a verinym context is unaware of other super-contexts and allows very clean separation of verinym authority. In some implementations an ENT context may store policies, keys or other critical information for nested verinyms. In many implementations ENT contexts store the ownership policies for nested verinyms and any private keys need to decrypt data received from storage service providers. In one embodiment, nested verinyms store the control policies and any associated private keys for use with that policy.

In one embodiment, users interact with an ENT node through a User Interface (UI). In one embodiment, this UI displays an ENT context, the ENT Node verinym for the device running the UI, its status, nested verinyms, and other information of value to the UI user. In one implementation, the user may modify the properties of verinyms using the UI, to include actions such as modification of verinym policies, connection or disconnection of verinyms from external or internal applications, modification of internal programs used by the ENT node, or any other purpose. Additionally, the UI may display to the user information about peers, peer connections to the ENT context or nested verinyms, or permissions or access control properties of the verinyms in the context. In one implementation, users of the UI may establish an ENT context by directing the ENT node to embody an ENT context verinym of the owner's choosing. In one embodiment, users of the UI may switch ENT contexts from one to another through direction input into the UI.

In some implementations, the UI may display to the user attempted or pending connections to the ENT node via the API or externally through the network. Additionally, the UI may display pending status of authorized messages that require authorization from multiple embodied verinyms over a network or in different ENT nodes.

In some implementations, the UI may be integrated into the ENT node. In other implementations, the UI connects to the ENT node via the API or other interface on the same computational device. In some implementations, the UI may connect to an ENT node remotely over a network or via some other communication channel. In these cases it is vital that the UI connecting to an ENT node is authorized. In typical implementations, remote control of an ENT node would be through the ownership or control policy of the ENT Node. That is, the UI has a verinym that can evaluate the control or ownership policy of the ENT node to true.

In some implementations, the UI is based on the same design elements as a contact manager, where each contact is a verinym. The user may associate nicknames with each verinym, add additional context information for individual verinyms, add, remove or examine the specifics of each verinym through the UI. In some implementations, the user may inspect the details of a verinym by selecting that verinym in the UI. Common information displayed may include such things as the policies for that verinym, or a notification that the policy cannot be examined if only a policy hash is available, the state datum or parts thereof, creation time, time the verinym was last renewed or updated, etc.

Terms of Service:

It is common for users in digital systems to sign Terms of Service (TOS) with providers of software. In one novel implementation, ENT node owners, or owners of embodied verinyms may require that software providers sign a TOS prior to use of an embodied verinym via an API. In some cases, the provider/owner of the software, and the owner of an embodied verinym may need to dually authorize each other through dual acceptance of the other party's TOS. In some implementations, the specified TOS is included in the state datum for a verinym. In some cases, the TOS may itself be represented by a verinym id, where both parties can establish the verinym id matches a TOS that is entered into. In some cases, the TOS is listed in a textual or other readable format in some well-known location, and may be accessed via URL, or other lookup mechanism.

Figure 13:
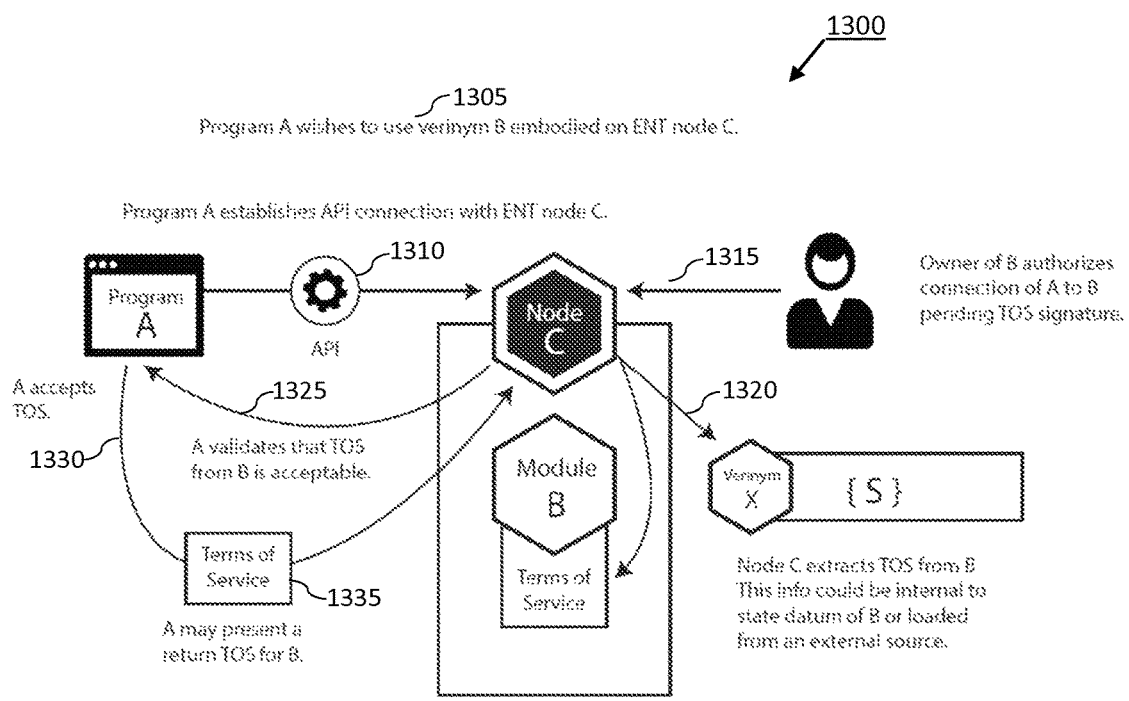
FIG. 13 illustrates a terms of service authorization process according to an embodiment of the invention.

FIG. 13 illustrates a terms of service authorization process 1300 according to an embodiment of the invention. Here, Program A wishes (step 1305) to use verinym B embodied on ENT node C. Program A establishes (step 1310) an API connection to ENT node C. The owner or controller of B, depending on implementation, authorizes (step 1315) a connection of A to B pending TOS signature. ENT Node C extracts (step 1320) the TOS for verinym B. This information may be internal to the state datum of B, or may be loaded from an external source. Program A validates (step 1325) that the TOS presented by B is acceptable. In some implementations, this is straightforward if the TOS is represented by a verinym, as this allows a simple check of verinym id against a well-known list of acceptable TOS ids. Program A accepts (step 1330) the TOS. In some implementations this may mean that the owner or publisher of program B creates an authorized message containing the TOS signed, the verinym id of B, and sends this message to B. Program A may also present (step 1335) a TOS for B. This may happen before or after B presents its TOS. In this case, the owner of verinym B may create an authorized message containing the TOS signed, the verinym id of A, if applicable, and send this message either to A or the owner/publisher thereof.

ENT Programs:

ENT nodes are computer programs that provide verinyms with an execution context, allow those verinyms to communicate over a network with other verinyms, and access and modify verinym state data. It is useful for ENT nodes to exist in a modular framework, such that these different functions can be separated from each other cleanly. In one implementation, ENT nodes are a collection of computer program modules that may be compiled or may be encoded in a byte code or interpreted syntax. In one implementation, these modules communicate with each other via a standardized interface. In one implementation, this interface is a pipeline topology for data flow. In one implementation, this interface is a network topology. For example, a message received over the network may enter one module that decompresses a compressed message; this decompressed message is then passed to another module that authenticates the message, and so on.

In some implementations, this data flow can be defined on a per verinym basis instead of being fixed. In these implementations, each verinym state datum contains a directive of how message data should be processed through a data flow. In some implementations each of these modules is given a name. In some implementations, this name is a verinym identifier.

In some implementations, data flow modules may handle messages or policies of a certain type. In one implementation, a message type present in a message may direct the data flow to use a specific module for that message. This module, in some embodiments, may examine or evaluate specific policies for a verinym in order to process the message. In one embodiment, a module may examine the semantic meaning of policy contents against internal rules to establish the module's course of action.

In one embodiment, the state datum for a verinym may consist of a compiled or interpreted computer program. If the state datum is an interpreted language, it may be capable of running in any execution context available at any entity in an ENT ecosystem. If the state datum is a compiled program, it may only be ran in execution contexts for which the compiled code is properly implemented to match the computer architecture. Define a verinym with such a verinym state datum as an "ENT program".

In one implementation, embodied verinyms may execute ENT programs. In implementations where a stable ENT namespace is used (non-GENT systems), a verinym has strong assurance that an ENT program is authentic just by knowing its name. This can be derived from the fact that the ENT program has an ownership policy, control policy and a datum that is signed either by the ownership policy or the control policy, depending on implementation. Only the entity in control or having ownership of such a verinym can sign or authorize the state datum, and any other entity can easily validate by executing the appropriate policy against the signatures appearing with the datum. Verinyms can therefore identify and store authentic ENT programs by name, and when embodied, load and execute the datum for an ENT program by name. This allows authentic, authorized execution of computer programs.

In one implementation, ENT programs are external to the ENT Node, but may still execute on the same device. In some implementations, the embodied verinym's state datum is accessible to the ENT program, and the ENT program may use the datum to maintain program state. In some implementations, a verinym's state datum may be used by multiple ENT programs. In some implementations, there is a one to one mapping. This is useful is that it prevents two programs from modifying the same data, and also simplifies routing of data and messages through a verinym to an ENT program. In some implementations, ENT enabled applications are similar to ENT programs, except that they are not represented as verinyms in an ENT system, and are instead handled, loaded and executed through some other means. In typical implementations, ENT enabled applications are external to the ENT node.

In some implementations, ENT programs may modify the internal operation of an embodied verinym or ENT node through modification of its data flow. ENT nodes are used in many different ways, as are verinyms, and this allows generic malleability across contexts. That is, these techniques can modify the behavior of an embodied verinym to include additional facility, security, and new or different design patterns. In one embodiment, each module may be a state datum of a verinym. In implementations where ENT nodes are modular, ENT programs can interface with/into the ENT node as modules. This allows authorized code to be inserted into an execution context, and indeed inserted into a specific data flow in order to extend or improve, modify or correct ENT node performance and features.

In some implementation, data flows consist of a network of modules, where one or more inputs to a module is the output of one or more other modules, data or events from outside the ENT node, or timer generated events from inside the ENT node. Data flows, in one embodiment, consist of a branching list of verinym ids. The state datum for each verinym identified is a module used at that step in the data flow. In some implementations, the data flow is contained in the state datum for a verinym. Depending on implementation, it may be modified by the user of the UI, the owner of the verinym, or the controlling party. In some implementations, data flows may allow additional internal modules to be inserted at arbitrary points in the data flow, thus modifying the data flow network of modules. This is beneficial in that it allows arbitrary modification to the execution of module functionality.

In some embodiments, modules may be built into the compiled ENT node software. In some embodiments, built-in modules may be overridden by newer versions of those modules available from an ENT ecosystem. In one embodiment, overriding a module involves modifying the data flow is use by a verinym, according to its state datum, or by an ENT node according to its configuration, to replace the built-in module with a module housed in the state datum of another verinym.

In some embodiments, modules in a data flow may redirect output in the data flow based on module features and needs. That is, the output of a module may be redirected from default by that module depending on the needs and features of that module. In some implementations data output from a module may be marked for either default processing or custom processing. If marked for default processing, the output will be routed to the next module in the default data flow as dictated by the default configuration of the ENT node, or the default data flow designated by a verinym state datum. If marked for custom processing, the output will be routed to an explicitly defined module, if one exists.

Figure 14:
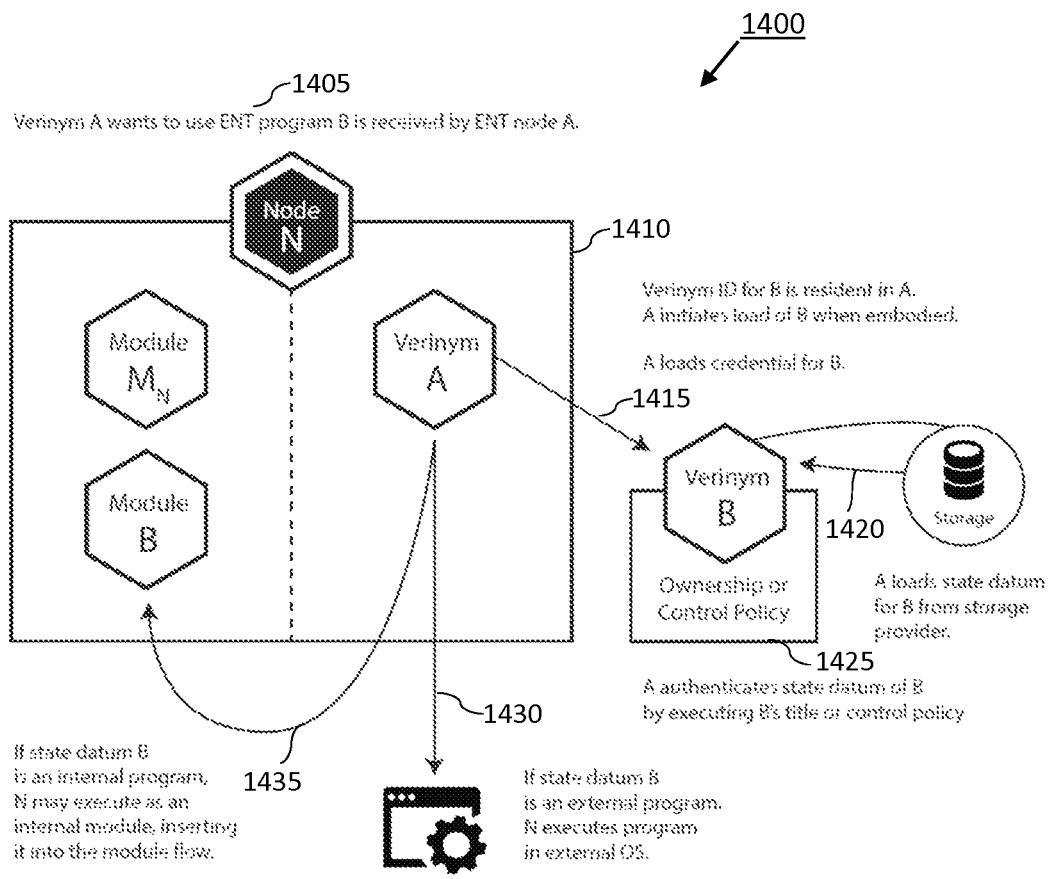
FIG. 14 illustrates a process for loading and using ENT programs according to an embodiment of the invention.

FIG. 14 illustrates a process 1400 for loading and using ENT programs according to an embodiment of the invention. Here, Verinym A wants (step 1405) to use ENT program B. The verinym id for program B is resident in A's state datum, and when A is embodied, A initiates (step 1410) action to load program B. Verinym A loads (step 1415) the credential for verinym B (ENT program B). Verinym A loads (step 1420) the state datum for verinym B from the appropriate storage service provider(s) or repository, depending on implementation. Verinym A authenticates (step 1425) the state datum for B by executing the control or ownership policy of B, depending on implementation. If the state datum contains information dictating that the datum is an external program, the ENT Node may execute (step 1430) the program in the external operating system. If the state datum contains information dictating that the datum is an internal program, the ENT Node may execute (step 1435) the program as an internal module, inserting it into the module data flow as dictated either by the user, information in the verinym state datum, or by some global rules, depending on implementation.

In some implementations, ENT programs comprise interpreted languages or runtime environments that would allow programs to execute internally or externally to an ENT node. In these cases, the runtime environment ENT program may be loaded in the same manner as any other ENT program. This is useful as it allows any number of interpreted languages to be incorporated into an ENT node context and made available for general use by other ENT programs. This allows multiple computer languages and approaches to be used simultaneously. Since each ENT program is by definition authorized and authentic, any level of additional functionality becomes possible, without needing compiled support.

In some implementations, ENT programs may consist of computer language compilers. In this case, the compiler ENT program is loaded identically to any other ENT program. In some implementations, the compiler may be inserted into a specific data flow or may present a specific API for use. In one embodiment, ENT programs may consist of textual programming language syntax. In this embodiment, ENT programs may be passed through the compiler's data flow and compiled into machine language executable either as an internal or external ENT program. In some implementations, ENT nodes may keep contextual information about the hardware and operating system of the computational device on which the ENT node runs, and an ENT program compiler may use this information to fulfill compile-time requirements of an ENT program being compiled.

In some implementations, a verinym state datum may consist of a data schema, such that validation of a message against that schema can validate or invalidate the message based on message syntax, fields, and form. One type of common schema is JSON schema, which allows JSON syntax messages to be validated based on rules in a JSON schema. ENT programs that consist of a schema may be used as data flow filters in a verinym or ENT node data flow. When inserted into the data flow, these schemas may act as filters for messages that pass through the schema module, and may either allow the message to pass or reject the message based on validation against the schema. In some implementations, ENT program schemas may be textual documents that are loaded into a pre-existing module, where that module can parse, interpret and filter a message based on use of that schema.

Figure 15:
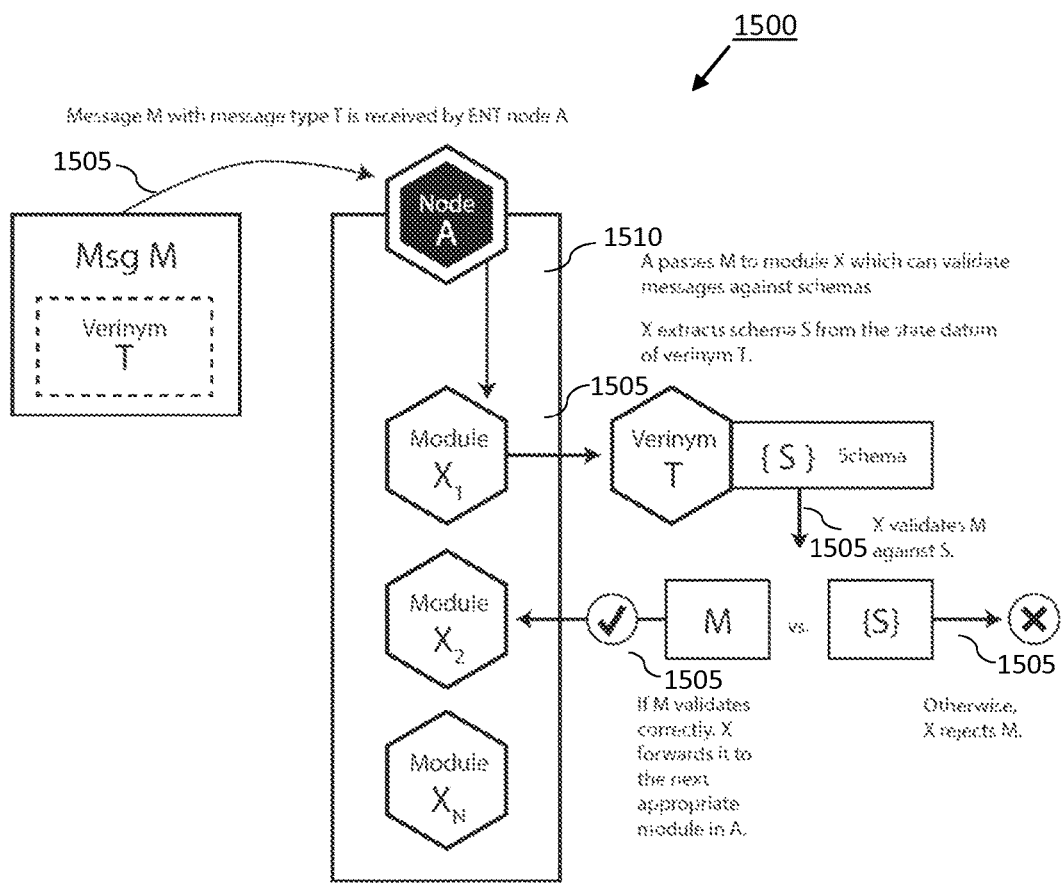
FIG. 15 illustrates a process for validating a message schema according to an embodiment of the invention.

FIG. 15 illustrates a process 1500 for validating a message schema according to an embodiment of the invention. Here, Message M with message type T, is received (step 1505) by ENT node A. In some implementations, T is a verinym id, whose state datum consists of schema data. A passes (step 1510) M to module X, which can validate messages against schemas by message type. X extracts (step 1515) schema S from the state datum of verinym with id T. X executes/evaluates/validates (step 1520) message M against schema S. If M validates correctly, X forwards (step 1525) the message to the next appropriate module in A. Otherwise X rejects (step 1530) M.

In some implementations, verinyms may virtualize and embody themselves in execution contexts. In one embodiment, a verinym contains, as part of its state datum, keys sufficient to evaluate its control policy to true. A verinym may then, in implementations where a control policy is sufficient to embody a verinym, request embodiment of itself in a different location. In some implementations, verinyms may additionally utilize ENT programs that instruct the verinym when and where to embody themselves. As one small example, a verinym may embody itself into execution contexts that are physically closer to another embodied verinym. Perhaps, one that represents the user. In this way, a verinym would move its context and data closer to the user when possible. Other examples include migration of data during server outages, verinyms moving into specific contexts for maintenance upgrades or upgrades to their state datum, etc.

Utilizing these principals allows an ENT system to run fully arbitrary code programs, modify the behavior of the system in a highly secure way, compartmentalize functionality into well-known standards, and provide a rich, tiered ecosystem of functionality that has never existed before.

These techniques allow some implementations wherein verinyms represent mobile data. Further, verinyms, using techniques found in ENT programs, may become fully motile in a decentralized ENT system. Integral, motile entities with virtualized execution and high integrity are simply unprecedented in computing history. Using these techniques, a new type of global network can be established, wherein programmable verinyms may move around freely of their own accord or that of their owners, performing tasks in a fully virtualized environment with full safety. No longer are there any static or centralized parts of a network, central data stores, or centralized execution whatsoever. The world's computing model has become fully virtualized, private, and secure.

Execution Service Providers:

In one embodiment, execution of ENT programs may be distributed across a number of execution contexts simultaneously. In one embodiment, programs may run in parallel across a number of ENT nodes. In a simple example, a policy context associated with execution of a program may contain a single policy that specifies a single verinym, that of the ENT node at which the verinym may operate. In this case, the verinym has specified an execution context (execution service provider) where it will be embodied, and where its data flow, loaded modules, and ENT programs will run. This simple example is equivalent to the above stated ENT node concept. The execution service provider is, as a reminder, an entity listed in the execution policy.

However, this concept, like all policies, can be generalized into a more useful framework. This framework uses the same constituent service providers and policies used in previous sections. In some embodiments, execution service providers are ENT nodes that, depending upon their configuration may allow a verinym to execute in their context. Further, an execution policy may contain multiple Boolean statements that imply various execution models.

In one embodiment, a Boolean operator of AND in an execution policy may imply that the same execution should be ran in parallel at all verinyms listed in the policy AND statement. For instance, a policy of "AND(A,B,C)" would signify that the execution of verinym modules, programs, etc. must be ran in parallel at verinyms A, B, and C. In one embodiment, an execution is not considered authentic unless the execution policy evaluates to true for each and every authorized message produced by the verinym. In the example, that would imply that A, B, and C are each performing all steps of the execution in parallel, and authorizing the result of each step synchronously. In effect, the computation of the verinym is being accomplished in triplicate, and the aggregate result is being used as the official verinym execution result via an authorized message. If A, B or C has a different result than the other two, the execution would not be authorized, and that execution step would fail. Likewise, in one embodiment, a Boolean operator of XOF, e.g. "XOF(A,B,C,2)" may be used that would allow an execution step or result to be authorized if two of A, B, and C yielded the same result. In one implementation, disagreements between execution results may be forwarded to user attention, and may allow detection of malicious activity, hardware error, etc.

In one embodiment, an improvement can be added such that each diverse execution environment executes ENT node modules that are different, but that produce the same result. That is, a type of module that performs a certain task may be built multiple times by multiple parties. Each of these modules should behave identically to the others in operation. In one embodiment, ENT nodes may load a module that matches a specific type. The module may be randomly chosen from a list, may be explicitly set, or may have more complex rules associated with it. Any module of that type must be identical in its operation. That is, inputs and outputs are identical across all modules of a specific type. This allows a heterogeneous approach to code stability. For example, an execution policy may contain a majority function and three different execution service providers, each of whom run the same module type, but different implementations of that type. Execution of one module may produce different results if there are code errors, or security vulnerability exists in one module. However, as the execution happens simultaneously in three execution contexts, it is less likely an attacker or error would be able to coerce results from two of those three executions. First, because the execution contexts are different, forcing an attack on multiple contexts. Second because the modules executing are also different, forcing an attack on multiple codebases. Third, legitimate coding errors can be caught when a result or operation of one faulty module disagrees with the other modules. Fourth, this provides an attractive alternative to product and code release cycles, than the current hard branching models typically used today. For example, newly written modules can be interleaved with existing modules in a production environment (on live installations) to ensure that results are consistently produced by the new code, without downtime or abrupt operational switchover.

These techniques are immensely useful for several reasons. First, multiple execution contexts running the same execution in parallel minimize the chance that a computer failure or glitch would invalidate a result, create an incorrect authorized message, or corrupt a state datum. It is common for data errors to be introduced into calculations when a failure occurs in hardware or software. It is common for high availability computing to require tandem execution of code, where the results of that execution must match. Tandem code execution is used often in stock market transactions, outer space operations, and other locations where glitches are exceptionally costly or much more likely to occur. Second, it is exponentially more difficult for an attacker to gain access to multiple execution contexts in diverse environments, especially if the execution contexts are heterogeneous in operating system, hardware, etc. Third, this technique allows, with a high degree of accuracy, for system administrators to catch errors or hacking attacks in their system. If an attacker were to gain control of an execution context, the results produced by that attack would be quickly spotted in the other execution contexts, as the outputs would not match. That is, even if an attacker has compromised an execution context, these techniques allow the attack to be recognized and mitigated without substantial effort on the part of the administrator. Finally, given the generic organizational principals used for execution service providers, it is possible to introduce code execution as a generic commodity. This greatly increases the potential marketplace for generic computational resources. Computing becomes fungible. Verinym execution may move throughout this fungible computing landscape depending on price advantages, spreading execution across multiple nodes for safety, all while maintaining strong integral identity.

Blockchain ENT concepts:

Blockchain based technologies, originally created by the Bitcoin currency, operate using a global database of chained hashed results. Hash A and additional new information is passed into hash B, which is then hashed with new information to create hash C and so on. This is a well-known technique for establishing non-repudiation, but blockchains operate by additionally adding computational complexity such that at each step the system as a whole must solve a "hard" problem before the chain is updated. The result is a distributed, audited record of events that can be used for many purposes. The main weakness of blockchain type systems for currency and more general use is the reliance on static asymmetric keys for authentication. These, like existing PKI systems, suffer from a credential boundary condition that invalidates intra-system authenticity. If a private key is used to access or modify critical data, such as sending currency to another party, then there is no internal system that can restore control to the rightful owner when that private key is lost or compromised. Identity, control, and ownership no longer exist once the private key is compromised or lost. This is a critical flaw.

Using novel techniques, we can build a blockchain implementation that allows distributed, strong identity that transcends these credential boundaries. In one implementation, a blockchain may include an "identity record". In some embodiments, an identity record may consist of one or more policies that contains functions, public key hashes, and pointers to other identity records. These records are analogous to ENT policies, and work in much the same way.

Figure 16:
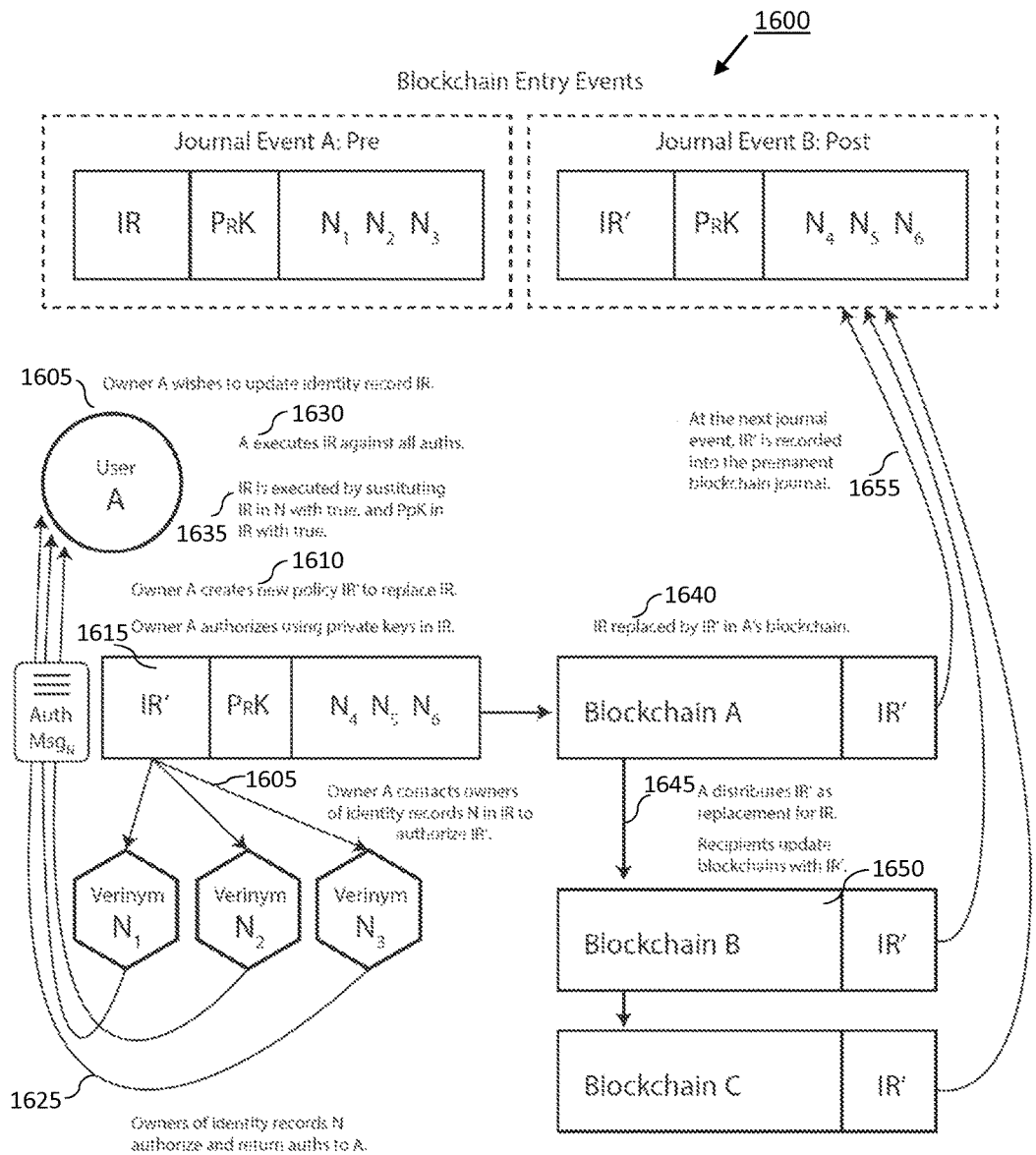
FIG. 16 illustrates a process to update an identity record according to an embodiment of the invention.

FIG. 16 illustrates a process 1600 to update an identity record according to an embodiment of the invention. Identity record owner A wishes (1605) to update their identity record IR in the blockchain that contains a policy with N identity records and keys. Owner A creates (step 1610) a new policy IR' that will be used as a replacement for IR. Owner A authorizes (step 1615) using any private keys listed in IR the replacement record IR'. Owner A contacts (step 1620) the owners of any identity records in N and requests they authorize IR' as the replacement for IR. Owners of identity records in N authorize, via signing using their keys, IR', and return (step 1625) these authorizations to A. A executes (step 1630) IR against all received authorizations each time an authorization is received. IR is executed (step 1635) by substituting an IR in N with a true value if that IR authorized the replacement IR', and by replacing any PpK in IR with a value of true if the PrK was used to sign IR' as a replacement for IR. If IR evaluates to true, IR is replaced (step 1640) by IR' in As blockchain. A distributes (step 1645), via broadcast to the network maintaining the blockchain, the authorization of IR' as a replacement for IR. All recipients of the authorized IR' evaluate the authorizations against IR, and if the evaluation of IR is true, they insert (step 1650) into their blockchain the authorization of IR'. At the next blockchain journal event, IR' is recorded (step 1655) into the permanent journal for the blockchain. IR' now officially replaces IR as the identity record for A. A has thus updated A's identity record using the authorizations of other identity records and private keys in the blockchain.

In one embodiment, other policy contexts may utilize this same sequence of processing. In some implementations, policy records may be updated using an identity record. In one embodiment, data records in a blockchain may contain an identity record or identifier thereof that is used to authorize changes to those records.

In one embodiment, a type of record called a control record may be implemented that authorizes the replacement or modification of other data records in the blockchain. One skilled in the art will be able to establish, given the techniques listed here and in previous sections, the proper mechanisms through which a blockchain system can establish credential continuity, and the use of policies to enable substantial novel benefit in arbitrary policy contexts.

While blockchain systems are generally inferior to ENT implementations, some embodiments may need a blockchain solution for backward compatibility or other reasons. These techniques can be used to establish strong identity continuity in such systems across credential boundaries.

Additionally, ENT systems may be integrated with blockchain systems. Blockchain record ids may refer to ENT verinym ids, allowing a record id, or authorizing agent for a record to be a verinym. If the blockchain system implements ENT features, a record may be authorized directly by a verinym via execution of its control, ownership or other policy.

Verinyms and Multi-factor Authentication:

In current state-of-the-art implementations of security products, the term "multi-factor authentication" is often used for establishment of identity via use of several proofs. Typical proofs are passwords, private keys, and biometric inputs, but generally there are main categories, secrets known to the user such as passwords and fingerprints, and computational secrets such as the PrK of a PPK.

This second form of computational secret, the PrK, is one of the core cryptographic primitives used to create ENT systems. ENT systems, as has been widely discussed, allow multiple PrK signatures to be collated into an authorization based on use of a policy. It is useful to examine how policies with multiple verinyms can be used to forward state-of-the-art multi-factor authentication via novel implementation.

In one embodiment, verinyms can represent and authorize action based on integration with biometric or other multi-factor authentication devices. Biometric devices are technologies that sense human characteristics and process these characteristics to determine if a characteristic matches the owner of the device. A typical flow of operation of a fingerprint scanner biometric device follows. A user swipes their finger over a sensor and the sensor reads the fingerprint of the user and examines unique markings on that fingerprint which it collates into a digital fingerprint. It then checks internal memory to see if the fingerprint matches one of the owners that the device should authenticate. If the digital fingerprint matches the one stored in memory, the device generates an output signal, or performs an action that allows the user to log in, or enter an authentic state.

Figure 17:
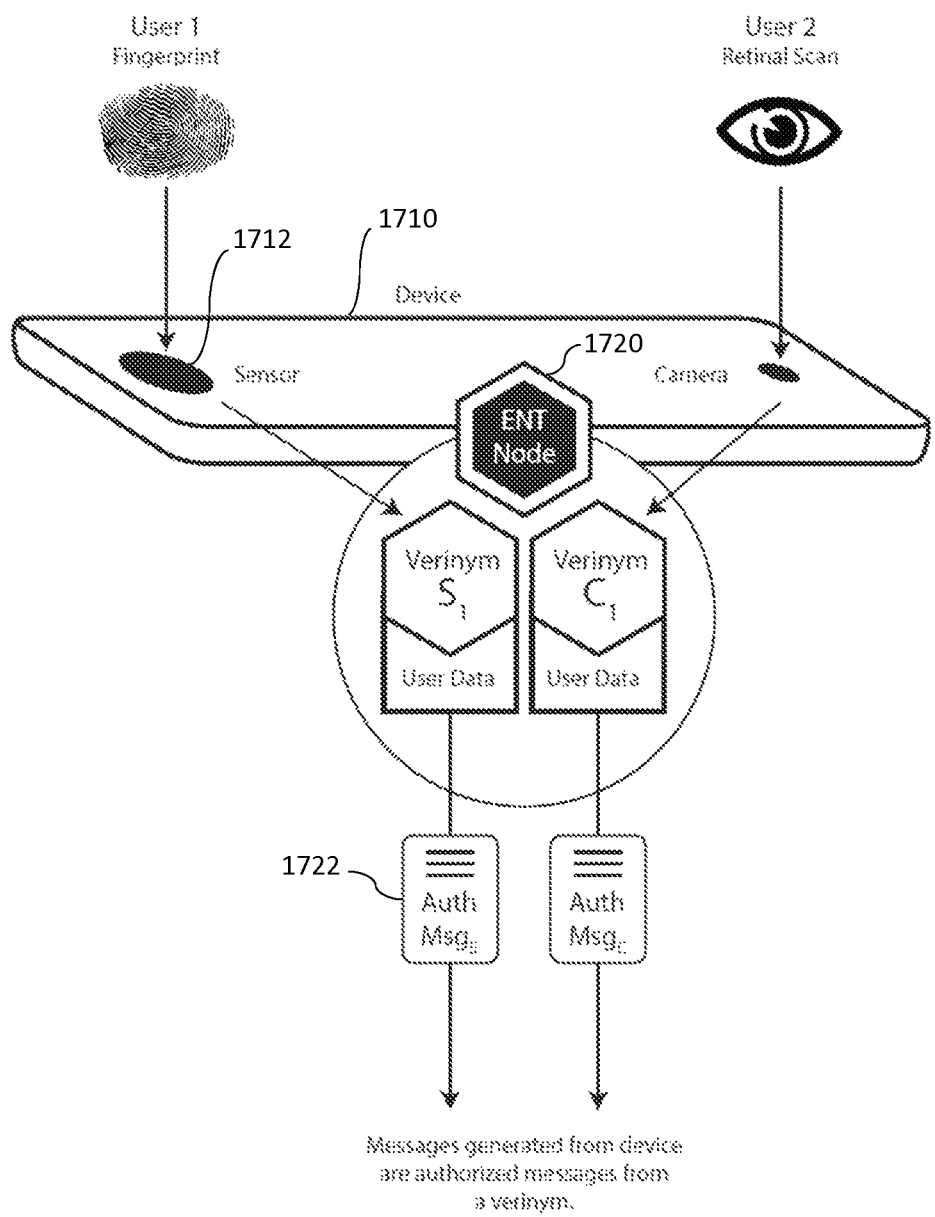
FIG. 17 illustrates a biometric device using verinyms according to an embodiment of the invention.

In one embodiment, a biometric device that contains computational resources can be made dramatically more useful in ENT systems by standardizing the output signal to use verinym authorization. Referring to FIG. 17, a biometric device 1710 scans or detects a user 1 via a fingerprint scanner 1712 and compares that user against a data set of known authorized users in its memory. In one embodiment, that device 1710 contains an ENT node 1720 with an embodied verinym Si that represents the biometric device. This verinym is capable of signing messages via use of a stored PrK on the device 1710 such that any messages generated by the device are authorized messages 1722 of the verinym.

In one embodiment, the device has a serial number or other identifier that identifies the device by its verinym id. A purchaser or user of that device can read the verinym id of the device, and insert that verinym id into one or more policies for use by the user. Typical implementations involve the user adding the device id to a control policy or ownership policy for a verinym used by the user. The control policy may include other verinyms and operators.

In one embodiment, the user, having registered with the device memory their unique biometric profile, uses the device. When the user uses the device, and the device matches the user against its internal memory, it generates a signed message 1722 authorized by the device verinym as its output. This basic mechanism is correct, but simplistic because the message authorized may not contain a useful directive needed to form a more general authorization. That is, the message data may be signed and authorized, but may not contain anything pertinent to the user's needs.

To address this, in some implementations, a biometric device receives input from another source prior to generating a message. In typical implementations, this input would be a message from some other verinym in the system that seeks authorization from the biometric device, or a message from some user trusted source. The message data is the data that the user of the biometric device wishes the biometric device verinym to authorize. The device, in one embodiment, may display to the user a checksum or hash of the data to be authorized. For example, the device may have a small screen that it can display numbers and characters on. In one implementation, this screen may show an alpha-numeric character string that corresponds to the hash of the message received by the device. The user may then check this character string against the hash of the message they want to authorize to ensure the message sent to the biometric device contains the message the user wants to authorize. In one embodiment, the user then activates the biometric device using a finger, etc. The biometric device now matches the biometric input against its memory, and if a match is detected the biometric device authorizes the message by signing via its PrK. In some embodiments, this authorized message is output from the device, and may be sent to the user via some mechanism such as network, screen, etc.

In one implementation, the biometric device may need to update its internal verinym. This may occur when the verinym credentials expire, or when directed by the user. In one implementation, the verinym of the device is owned by the user. In this case, the user simply authorizes, via the ownership policy of the device, the replacement of the policy associated with the device. In one implementation, the user notifies the device that it should create a new private key. The device creates such a PPK and notifies the user that it wants to renew its verinym credentials to use this new key. The user receives the message, and may check the device screen or other output to compare the new key received by the user to the key generated by the device. If they match, the user, via authorization of the ownership policy for the device verinym, may update the control policy within the credentials of the device with the new PPK. It is unlikely an attacker would be capable of spoofing this process so long as the user has physical possession of the device during this process. Further, it is unlikely the user would authorize a credential update of a device if the user did not have physical possession of the device and was notified that an update was requested. It is more likely that a device that left the user's possession would be removed from use in any policies owned by the user.

In effect, devices behave identically to other verinym inputs to a policy, but with the added physicality of device ownership. This allows biometric or other types of devices to be used as authorized members of a policy that creates authorized messages.

In one embodiment, a device may allow a user to use a password by replacing the biometric check with a password check. In this embodiment, the device allows input from a user via entering textual characters or numbers into the device. The device then checks this input against its memory to see if the password matches. If the password matches, the device generates an authorized message as output. In some implementations, this device uses the same mechanisms listed above. Using these techniques, a user can support authorized input from multiple devices to enact verinym authorization functions In one embodiment, a device may consist of a keyboard, mouse or other computer peripheral such as a camera, joystick, etc. In some implementations and using the above techniques, each of these devices can be used as authorizing input to a policy execution provided that: they have an embedded ENT node in which a verinym can reside and operate, they have verinyms whose PrKs are present in the device, and they have some way of displaying or communicating state to the user so that the user can ensure the message requests are authorized and correct.

Verinym Representation of Physical Goods and Property:

Verinyms are highly adaptable digital objects. In one implementation, verinyms can be used to identify people, goods, real property, groups of people, organizations, and governments.

In one implementation, verinyms can be used as digital copies of real world objects. In one embodiment, we can use verinyms to represent the ownership, control and legal standing of real world goods by mapping these goods to digital verinyms via a verinym id.

In one implementation, any physical good, such as a luxury item may be represented by a verinym. In some implementations, these goods would have one or more verinym ids stamped or embedded in the physical object. For instance, a physical object may have an RFID or other identifier built in, or may have a physical stamp, embossing, or depression. In some implementations, each constituent component of the physical good would have a verinym id stamped or embedded in the component. In some implementations, the collection of more than one id in a product may constitute the entirety of the product, and ownership of that group verinym constitutes ownership or control of the object.

Figure 18:
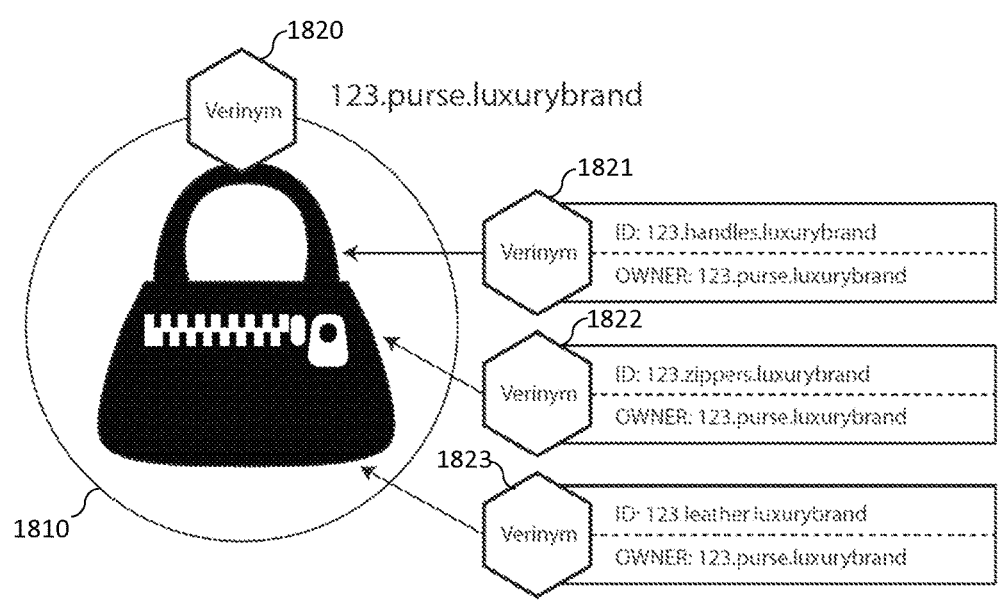
FIG. 18 illustrates digital ownership via title/control policies according to an embodiment of the invention.

In one implementation, ownership of the physical good can be tracked and transferred based on the ownership and control policies of the verinym. Referring to FIG. 18, a luxury purse 1810 may contain a verinym id 1820 that identifies the purse. It may include multiple verinyms inside the purse as well, where each component is stamped with a unique verinym id 1821, 1822, and 1823. All of the verinyms are owned by the brand creating the purse. In some implementations, the brand may be the namespace from which the verinyms are issued. For instance "123.purse-.luxurybrand" may be a verinym identifier, where the brand verinym is "luxurybrand", which has issued an id in its namespace to be used by the luxury good. In this case, the owner may also be the brand, but the namespace designates that the verinym id is official.

In one implementation, a person buying the product may, upon purchase, register the product with the brand. If the purchase was legitimate, the brand may transfer ownership of the purse to the purchaser during the registration process. In one implementation, the user may swap a verinym containing digital currency with the product verinym as the transaction. In typical implementations, the user will own the verinym id of the product after their purchase of the product. The product verinym is thereafter owned by a verinym controlled by the user, such as their personal verinym, or one created for this purpose. The user may now prove that they are the owner of the product to any party through creation of a proof message originating and authorized by the user's verinym. In typical implementations, a control policy authorization is used as proof.

For example, with this mechanism law enforcement can determine if a suspect is a likely thief. If an individual with a physical good marked with a verinym id cannot prove ownership via the ownership policy associated with the physical good, the physical good may be stolen. This mechanism gives law enforcement agencies a tractable mechanism through which they can identify suspects, track stolen goods, and even return those goods to the rightful owner.

Using this mechanism, luxury brands can also protect their brands through the use of verinyms as digital certificates of authenticity. As mentioned above, a verinym id that originates from a brand verinym may be the only authorized authentic source for the brand. A counterfeiter would not be able to create new verinyms from the namespace of the brand, in one embodiment. If the counterfeiter were to duplicate the verinym id from an existing brand product onto their counterfeit product, the credentials for that verinym have not changed ownership and would not be transferable. For example, a customer may know that "brand.verinym" is the only legitimate issuer of authentic verinyms for the brand. If a good did not contain verinym from this namespace, the customer would know the good was not authentic. Further, a customer buying a counterfeit good stamped with a proper brand id would be able to determine, based on their inability to transfer the product "deed" for that brand id, that the product was counterfeit. In effect, counterfeit goods would never have verinyms from properly authentic namespaces that could be transferred to the buyer.

In some implementations, computer enabled products such as smartphones, laptops, tablets, desktops, light bulbs, refrigerators, and any other devices containing computational components may have the verinym id embedded in the computational components directly. In one implementation, the CPU may have a unique verinym id embedded into its hardware. In these cases, the product ownership may be transferred to a buyer via the mechanism above. The buyer may then be able to remotely disable the device should that device be stolen. In one implementation, the owner of the device would create a new credential that disabled the device from executing the control policy for the verinym representing the device. In one implementation, if the device had embedded in it the verinym id, the device could determine if its control policy was valid or had been disabled by the owner. If the control policy was disabled by the owner, the device would stop operating, until such time as the control policy was no longer disabled. In another implementation, the owner may send a disable message authorized by the ownership policy to the device, which would disable itself until such time as an authentic "enable" message was received. Using these techniques, theft of digital devices may decrease as thieves determine that stolen devices can't be used, reset, or otherwise modified into a working state once stolen. In one implementation, devices in receipt of a disabling message may cache this message into non-volatile memory, such that a device reset could not remove the message. In some implementations, device may have a separate processor that is dedicated to executing an ENT node which handles these tasks.

In some implementations, components in a device may not function unless they are in proximity to other components identified authentically by verinyms. In typical implementations, such components would act as a group via a control policy for the device in aggregate. That is, the device would have a verinym identifying the whole device, but the device's control policy would be composed of embodied verinyms housed in the various components (each with an ENT node) in the device. In one embodiment, removal or tampering of these components would disable the device as a whole, as the control policy could no longer be evaluated to a true value. In some implementations other policies may be used in addition to or in lieu of the control policy for these tasks.

Fungible Goods in ENT:

Fungible goods are exchanged without identity, such that one good is identical to another. Money, currency, points, network bandwidth (Mbytes), computer execution time (MIPS or others), and other counter based goods are examples of fungible goods.

ENT systems excel in areas where exceptionally high levels of authenticity and identity are required. Fungible good systems benefit greatly from integrating ENT techniques. ENT offers substantial benefits in areas like transactional rollbacks, escrowed transactions, and recovery from loss or attack and allow very strong fungible systems to be built.

In one implementation, a system for exchange of fungible goods is created in which a group N of entities establishes a consistent, highly secure shared state, capable of transacting fungible goods between entities. We call this shared state an "exchange".

Figure 19:
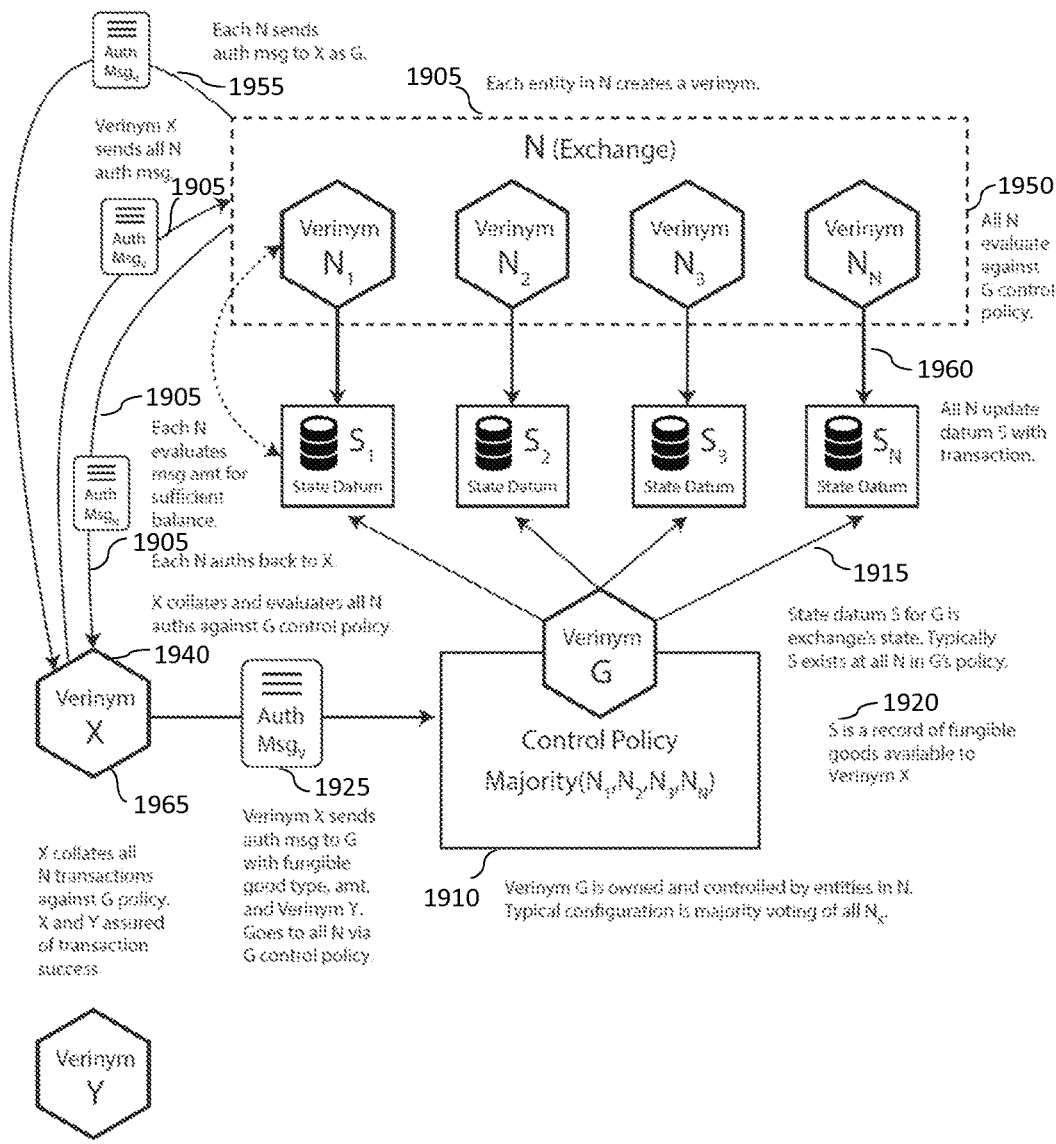
FIG. 19 illustrates a process for establishing a fungible exchange according to an embodiment of the invention.

FIG. 19 illustrates a process 1900 for establishing a fungible exchange according to an embodiment of the invention.

Exchange Transaction:

Each entity Nx in N creates (step 1905) a verinym. These verinyms are independently owned by each Nx, and typically are accompanied by one or more robust execution contexts per verinym. A verinym G is defined (step 1910), which is owned and controlled by entities in N. In typical implementations, the control policy for G includes majority voting of all Nx. In some implementations, the control policy may include multipart policy agreements such as a vote between groups Gx, each comprised of M members of N. In one embodiment, the security of the entity G should be maximized according to available resources.

The state datum S for G represents (step 1915) the exchange's state. In typical implementations, S exists at all N in G. In one embodiment, G is partially embodied at each execution context available to members of N. S is segmented into parts, such that sub-groups Gx in G may each manage one or more segment of S. For instance, an exchange may M sub-groups, each of which manages a specific segment of S, such that other Nx not in M do not have to authorize transactions modifying that segment in S. Verinym X has (step 1920) fungible goods in the shared state of G. In one embodiment, S contains a record of fungible goods available to X. This is X's balance. In one embodiment, S contains multiple records for X, each with a different fungible good or currency.

Verinym X may transfer fungible goods in S to entity Y. In typical implementations, X creates an authorized message containing the fungible good type, the amount, and Y. X transmits this request message to each entity in N. That is, X transmits (step 1925) this message to G. Each entity in N evaluates (step 1930) the authorized request message from X, establishes the balance available to X is sufficient to allow the transaction, and ensures that the transaction is valid. Each entity in N authorizes the identical transaction of X, and sends (step 1935) this authorization to X. X collates (step 16940) all authorizations of N, and evaluates against the appropriate policy of G. In typical implementations, the policy used for G is the control policy for G. If the policy evaluation generates a valid result, X submits (step 1945) the authorized request message to all entities in N.

Each entity in N evaluates (step 1950) the authorized request message against the appropriate policy for G. In typical implementations, this policy is the control policy for G. If authorized, each Nx creates a new authorized transaction message as G that contains the information listed in the request message, and sends (step 1955) this authorized transaction to X. Each Nx updates (step 1960) S to reflect the transfer of goods from X to Y, updates the balance for X, updates the balance for Y to reflect the goods transferred, and may add the transaction message details to S as a ledger entry. X collates (step 1965) all transactions from all Nx, and evaluates the transaction message against the appropriate policy for G. If the policy result is valid, X and Y are assured that the transaction was successful. In one embodiment, each Nx transfers the request message to each other Nx in N, instead of sending the authorized request message to X.

In one embodiment, X may have one or more policy contexts, one for each fungible good. Each policy context may contain policies containing one or more G as the fungible service provider for X. This can be thought of X having multiple exchanges associated with X, such that X can transact against more than one exchange for fungible goods.

In one embodiment, S may contain information for X that may limit the number or amount of transactions against the account for X. For example, X may wish to establish a withdrawal limit, escrow, or other limitation to prevent theft. In one implementation, this information may exist in a policy for X.

In one embodiment, an operator AND may be used to signify in a fungible policy that multiple exchanges are used to keep the same balance and state. That is, multiple exchanges may duplicate their efforts to further protect transactions of X against loss. For example, if X had a fungible policy "AND(G,H)" that consisted of exchanges G and H, then all transactions for X would be applied across G and H, and step 12 above would occur only if the requested transaction in step 8 was authorized by both G and H. In one embodiment, G and H must agree on the balance of X and other inter-exchange rules before X transacts.

In one embodiment, operator OR may be used to signify in a fungible policy that multiple exchanges may be used, individually, to transfer fungible goods from X to Y. In this configuration, X has multiple "accounts" at different exchanges, any one of which may be used. In one embodiment, when X creates a request message, X includes the exchange to use for the transaction.

In one embodiment, an escrow operator may be added that prevents transactions from consummating until after the escrow expires. In one implementation, a limit operator may exist in a fungible policy that may limit the amount of goods transferred per transaction period, or per transaction. In an example embodiment, X's policy "OR(WITHDRAWL(300, ESCROW(14,G)),H)", and may mean that there is a limit of 300for a withdrawal, and an escrow of 14 days when using G. Transfers and withdrawals from H are unhindered. Perhaps G is X's savings account, and H is an account without much money in it used for arbitrary bi-weekly activity.

In one embodiment, X creates an authorized message containing the transaction details and sends this to Y. Y may then use this authorize message, and the fungible policy for X, to complete the transaction as follows. X wishes to transfer goods to Y. X creates an authorized message containing the fungible good type, the amount of goods, and Y. X sends this message to Y. In one embodiment, Y examines the semantic meaning of the fungible policy for X. Y performs the steps found in "Exchange Transaction" above against exchanges chosen for X. Y notifies X of a successful or failed transaction.

In one embodiment, it is useful for Y and X to exchange a real good P for fungible goods. In this case, we can combine the techniques of verinym swaps with the techniques of fungible goods.

In one embodiment, X may establish a new verinym Z. X may then transfer into the account for Z an exact fungible amount needed for the transaction with Y. X and Y may then establish a verinym swap such that Y acquires Z, and X acquires P. In this way, X has acquired the good presented by Y and Y has acquired ownership of an account containing fungible goods. In one implementation, an escrow period for the verinym swap may also be used to allow either party to back out of the transfer during the swap process.

Figure 20:
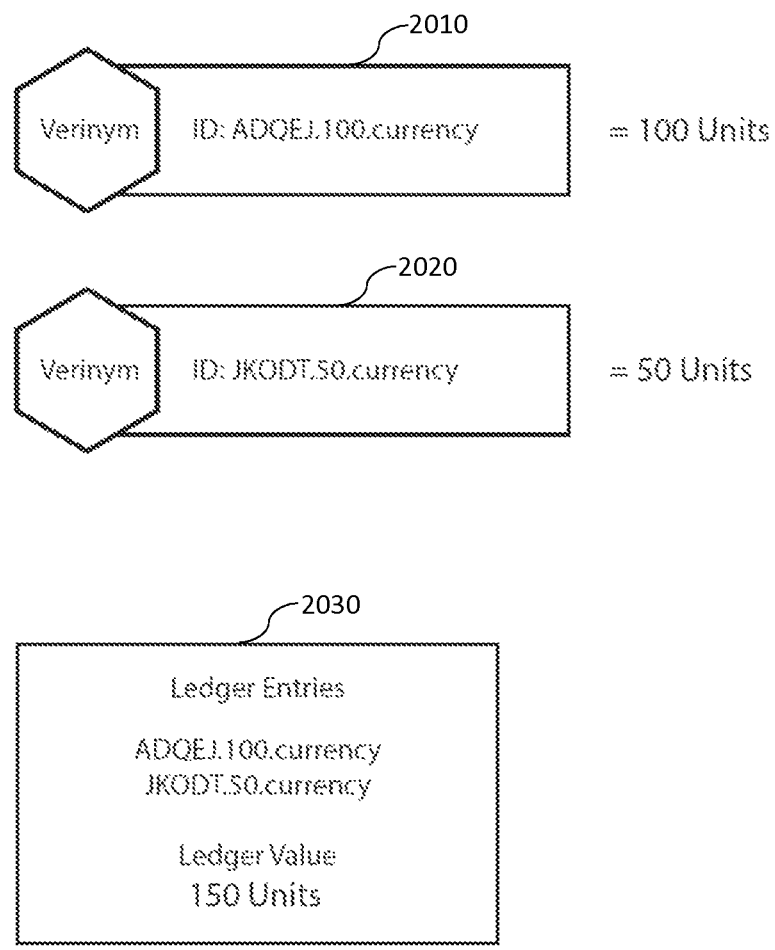
FIG. 20 illustrates fungible verinyms according to an embodiment of the invention.

In one embodiment, fungible exchanges are not used, and fungible goods are represented directly as verinyms. Referring to FIG. 20, these verinyms are called "fungible verinyms". Here, each verinym used as a fungible good has a denomination. That is, it has a value associated with its existence. This value may be directly in the state datum for the verinym, or may be queried at another verinym that is trusted to identify the correct denominations for verinyms. In one implementation, a namespace may designate a fungible goods space, such that individual verinyms in that space are designated as fungible goods. In one implementation, the identifier of the verinym may contain information used to determine its denomination. For example, verinym 2010 has a verinym id "ADQEJ.100.currency" that designates a fungible verinym with denomination of 100 units. Verinym 2020 has a verinym id "JKODT.50.currency" that designates a fungible verinym with demonization of 50 units.

In one implementation, fungible verinyms are exchanged through a fungible exchange, wherein the fungible exchange's ledger 2030 contains verinym ids instead of fungible amounts, and transfers between accounts consists of transfers of fungible verinyms between accounts that represent the correct denomination. For instance, an example transfer of 150 units from one account to another may consist of a transfer of fungible verinyms 2010 with denomination of 100 and transfer of fungible verinym 2020 with denomination of 50.

In one implementation, fungible verinyms are owned by an owner, and transacted by exchanging ownership of those verinyms. Ownership policies may be modified as normal to allow the owner to set an escrow period, modify the entities involved in a transfer, etc. In one implementation, larger denominations may use longer escrow periods to ensure that ownership transfers are authorized.

In one implementation, fungible verinyms may transfer ownership very often, and may not be owned by one entity for very long. In these instances, existing validity promulgation techniques may not be appropriate as a mechanism to limit double-spending and other problems. In one implementation, a clearing house policy may be used by the issuing verinym namespace. This policy may contain verinyms that when queried reply with authorized messages containing the current state of a fungible verinym. In one embodiment, a valid fungible verinym ownership state is determined by executing the policy against multiple verinyms in a clearing house policy, and collating authorized message responses.

In one implementation X may wish to swap owned fungible verinyms for a verinym P owned by Y. X may create a new verinym Z, owned by X, and transfer ownership of the fungible verinyms to Z. X may then initiate a verinym swap between P and Z. In this way X can gain ownership of P, and Y can gain ownership of Z and its owned fungible goods.

Verinyms and User Data:

ENT systems provide a wide range of benefits for users such as privacy, ownership, security, and control of data. Users often find themselves in a tough position of wanting to collaborate and share their information while simultaneously needing to control sensitive information such as social security numbers, medical records, phone numbers, email addresses, credit card numbers, etc.

In one embodiment, verinyms can represent tokenized user data with exceptional characteristics. User data can be masked and gated using ENT techniques.

In one embodiment, simple data like telephone numbers, addresses, email addresses, and social security numbers can each be represented and protected by a verinym. In typical implementations, these data each are represented by separate verinyms, where the verinym identifier is opaque when chosen. That is, the verinym id may be randomized or disassociated from the data or identity held by the verinym. In typical embodiments, an individual datum is held separately by each verinym. For example, a street address may use one verinym for the zip code, one for the street, one for the state, and one for the address number.

In typical embodiments, the user will directly own and control these verinyms such that a user's verinym is capable of renewing or controlling verinyms. In typical embodiments, users maintain a "master" verinym that is owns all of their other verinyms and is capable of performing renewals. In some cases, it may be beneficial to create multiple verinym contexts, each with a separate focus. As one example, a user may create personal, work, and public context verinyms, each owned by their master verinym. The user may then create additional verinyms that are owned by each of these contexts, allowing for compartmentalization of user data by task.

Users are presented with a number of ways of gating access to their information using ENT techniques. In one embodiment, a user datum is held in a lightweight verinym, and is encrypted. Only peers who have been given the decryption key may access the datum. Typically, symmetric cryptographic techniques are used, and the user holds the symmetric keys in one of the verinym contexts. In another embodiment, the user may create multiple encrypted credentials for a verinym, each of which is encrypted using one or more public keys associated with authorized peers. Only those peers with proper private key may decrypt the credential and access the data.

In one embodiment, using promulgation techniques, the user may update the datum at any time. In this case the user modifies the lightweight verinym such that the datum held within is updated. In one embodiment, the user may use a new symmetric key to encrypt the datum in a renewed or updated verinym. This prevents parties who previously had the symmetric key used to decrypt the datum from accessing the updated information unless explicitly allowed by the user through dissemination of the symmetric key. Promulgation of replacement user data is a powerful mechanism for users, as it allows users to create, manage, and update user data, and automatically sync that data to all authorized parties. As one example, a user verinym may contain the user's telephone number, and the user may distribute the verinym instead of the telephone number. When that number changes, the user may use promulgation techniques to update all authorized peers with the new verinym containing the updated telephone number. The same mechanism applies to other user data as well, including credit cards, bank accounts, mailing addresses, and various types of identification.

In another embodiment, a user may store the heavyweight verinym datum at one or more storage service providers, and gate access to the data at those providers using ENT techniques. In one implementation, a verinym may not be embodied unless an authorized party allows. In typical implementations authorized parties are parties that exist on the control or ownership policy for a verinym. If a user wanted a peer to have access to the data, the user may add that peer to a control policy for the verinym. Only peers in a control policy may embody the verinym datum, as only those parties are allowed by the storage service providers to access the datum associated with that verinym as part of the embodiment process. In one embodiment, other policies may be used for this purpose, or new policies may be created as a data access list. In one embodiment, lightweight verinyms may use the same technique, although it is likely that a credential service provider would be used instead of a storage service provider since the datum exists inside the credential.

In one embodiment, users may maintain legal authority over data held in verinyms through the use of a Terms of Service (TOS) with peers. In typical implementations, a user would maintain a TOS that stated that no data, including lightweight credentials may be held by a peer at any time other than during transactions. In this implementation, a non-violating peer that signed the TOS would not store user data, and instead would retrieve that user data on demand from the user or agent thereof. Users then need only maintain a list of authorized entities with access to that data, and need not worry about the safety of data copies kept elsewhere. This may allow users to gain both legal and technical protection of user data. Further, this enables systems where a specific datum lives only in a single "place", that of the verinym id.

In one embodiment, a datum is stored by the user, and stored by a remote peer, but not stored anywhere else, including in a verinym. This has the benefit of never broadcasting the datum. In a typical embodiment, a user and a peer may negotiate the datum over a different medium, such as a telephone call, written exchange or other means such as barcode, etc. As part of the negotiation, the user and the peer link that datum to a verinym controlled by the user. The user may also own the verinym, depending on implementation. The peer may utilize the datum for certain transactions, when authorized by the user's verinym. This allows the user to establish other relationships and transactions that may use the datum, without those other peers gaining access to the datum except through the linked peer. As one example, a user may establish with a credit card company a verinym using this method, that links a verinym to a credit card number. The credit card company may charge a credit card only when the verinym associated with that card authorized a transaction. In this case, the user may distribute the verinym identity of the owned verinym to peers and $3^{rd}$ parties, without revealing to those parties, the credit card number itself. When the user transacts the verinym via authorized messages, the messages may constitute an authorized billing of the credit card associated with the verinym.

Figure 21:
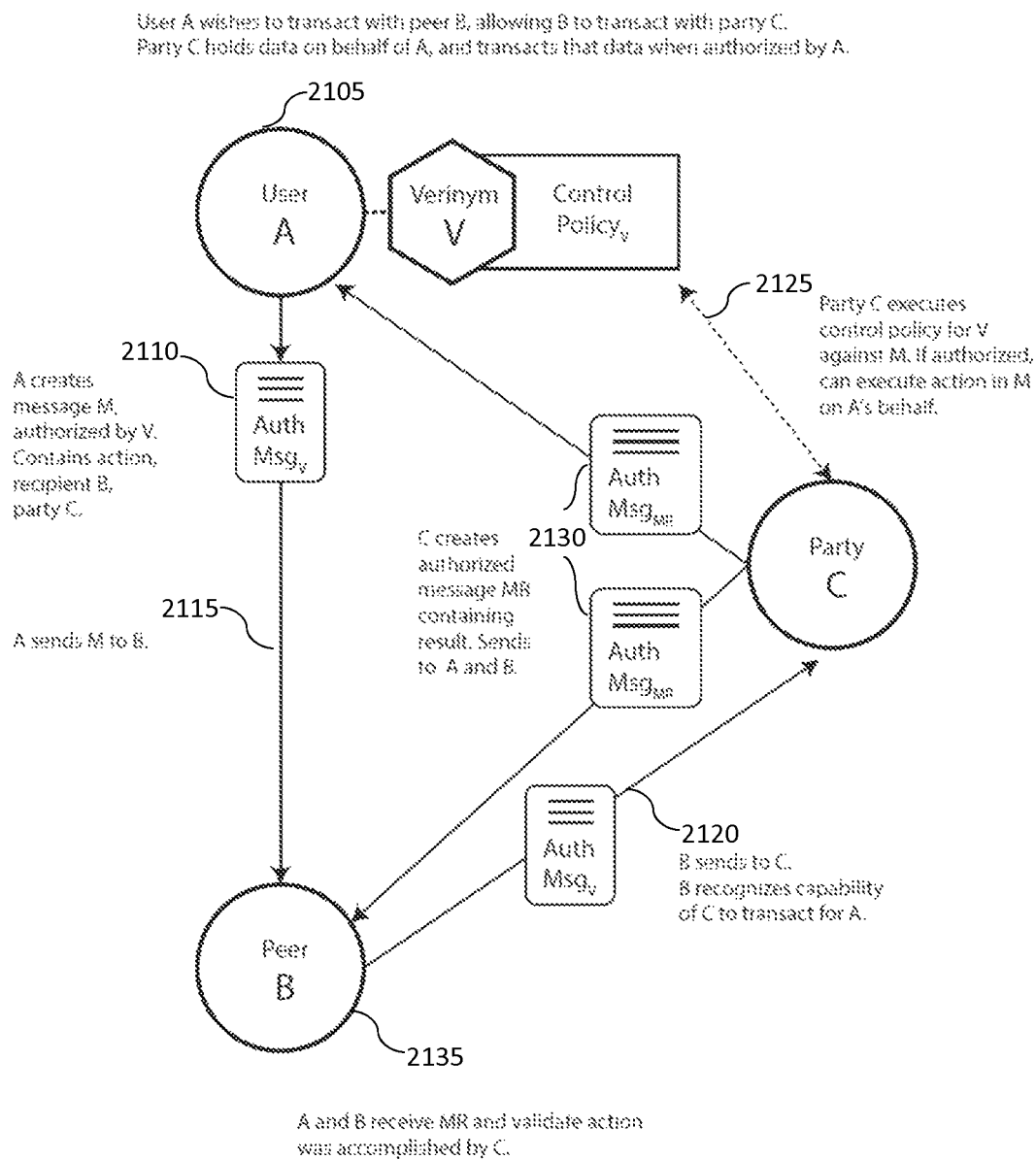
FIG. 21 illustrates a process for masked user datum exchange according to an embodiment of the invention.

Masked User Datum Exchange:

FIG. 21 illustrates a process 2100 for masked user datum exchange according to an embodiment of the invention. Here, User A controlling verinym V wishes (step 2105) to transact with peer B, allowing B to transact data held by party C. Party C holds data on behalf of A, and transacts that data when authorized by A. User A creates (step 2110) a message M authorized by V, that contains an action, recipient party B, and party C. User A sends (step 2115) M to B. In some implementations A sends M to C directly. Peer B receives M and sends (step 21220) to C. In typical implementations, C is well-known to B. That is, B recognizes the capability of C to transact for A. For example, if C is a government office, B recognizes C's authority to issue certain authentic responses consistent with the action in M, such as validation of an identity. Party C executes (step 2125) the control policy for V against M. If authorized by V, C performs the action in M on A's behalf. C creates (step 2130) an authorized message MR containing the action result, and sends MR to A and B. In some implementations, C sends the message to A or B, who then send the message on B or A respectively. A and B receive MR and validate (step 2135) that the action was accomplished by C. B never had access to the data transacted by C. That data was masked without interfering with A and B's ability to transact.

This same mechanism may be used with the Social Security Administration for use with social security numbers, Department of Motor Vehicles for use with driver's licenses or personal IDs, or any other system where certain centrally controlled data is used to interact with the physical world or legacy systems such as remote log-in without passwords, etc. This is highly useful for agencies as it allows a massive reduction of user management cost, since users control and own their verinyms, without damaging the integrity of the identifier itself. Additionally, it allows the user to act as a gatekeeper of their own information access. For example, a SSN, driver's license picture, or credit card is inaccessible to any $3^{rd}$ party except the party that issued that information to begin with.

In one embodiment, users may authorize $3^{rd}$ parties to access, add, update or otherwise modify the datum associated with a verinym. In typical implementations, a user would be notified of a request to access or modify a user-owned verinym datum. In this case, the user may authorize, typically via a control policy, modification of a verinym's datum, and may return this authorized message to the party seeking access, or to its service providers providing the service to the party seeking access. In one embodiment, users may authorize access or modification of a user datum to parties for a specified period of time. For instance, a user may allow a user's computer to access a verinym datum associated with a user's social network account for one hour. After this time, the computer would no longer be allowed to modify the user datum. In one implementation, the authorized party would, during the allowed period, submit to the user or a storage service provider data to be added, removed or queried. The user or storage service provider may allow access to the authorized party during this period, but would reject access to that party outside of the authorized time. As another example, a user medical record may be accessible to a physician for a limited amount of time authorized by the user.

User data may need to be made available at times and during circumstances that may be difficult to authorize using typical mechanisms. For example, if a user is incapacitated or has a serious injury, that user may not be able to authorize access to their medical history via typical means. As another example, if a user dies, the data held by that user's verinyms may be inaccessible to family or the estate. ENT techniques provide substantial benefit in these circumstances when compared to other technologies. In one embodiment, a user may define a trusted $3^{rd}$ party through which emergency access may be granted. This $3^{rd}$ party may be added to a control or ownership policy. In some implementations, these trustees may only act based on pre-negotiated contract with the user. In one embodiment, these contracts are legal contracts.

For instance, a trustee may only allow a medical physician to access user records if the user is incapacitated, and the institution treating the user is recognized by the trustee.

In another example, user data and access can be lost when a user dies, but using ownership policies, it is likely that the user has friends, family or legal trustees that can unlock the user's verinyms and transfer control or ownership of the estate to the correct party. In effect, control and ownership polices provide power-of-attorney verinym privilege, depending on implementation.

Combining these techniques, users gain resilient long-term control of their digital information. In one embodiment, a user may maintain total control of both the access to their medical records and physical access of the digital data in those records. First by owning and controlling the verinym representing the record, and secondly by owning or controlling the data storage housing those medical records either directly or through service provider mechanisms. Users can choose any arbitrary level of protection of their data simply by defining the policies and parties that reflect their preferences. In the case of user death, data and verinyms are not lost because of the versatility and power of ownership policies. Simultaneously, the user may have override controls, even over family and friends, via legal agreements with paid trustees. With these techniques, ENT enables an exceptionally efficient framework for digital contract law that is explicit, fair and reflects user choices. These capabilities are simply unprecedented in the history of digital systems.

Verinyms as Content Delivery Vehicles:

Current state-of-the-art implementations utilize data spread across may distribution centers close to consumers of that data. These networks are commonly called Content Delivery Network, or CDNs. A provider typically implements a CDN by placing servers at locations close to high availability fiber channels. Users close to those hubs can load data from those hubs instead of loading data from the original data source. In essence, CDNs proxy data closer to the physical location of users for consumption.

Using verinyms, a distributed CDN can be created in which the servers no longer need to be owned by a single provider. Further, servers no longer need exceptional characteristics, and CDN data can be pushed very close to the user.

In one implementation, data requested or useful to a user is identified by a verinym. That is, the data of a verinym is the data requested by a user. In typical implementations, a single datum is represented by a single verinym. Verinyms and their associated data is authentic, so the physical location of the verinym data is no longer an issue from a distribution standpoint. Any user may authenticate the data presented to them against the system state of that verinym to ensure that the verinym is both authentic and up to date. Through use of certificate promulgation outlined in other ENT literature, a verinym can, with some latency, always reflect and distribute the most recent version of a datum. Other techniques such as time to live TTL may be used to reduce the latency of validity checks.

In a typical embodiment, any entity with computational resources may solicit into a global public list that they are capable of hosting embodied verinyms for data transmission. In some implementations, these entities may also publish their physical location such that requestors of hosted data may be physically close to these entities. Additional information may include fees for data distribution, or other market characteristics.

In common implementations, owners of verinyms that need data distribution may then pick providers in this list, based on price, location of consumers, etc. In one embodiment, owners of verinyms may create a list of such providers, and implement a policy that reflects the locations of said providers. In one implementation, the owner would update the storage policy of the verinym to include all providers of CDN services. Alternately, the owner may use another policy such as a CDN policy to list the providers chosen. In some implementations, the policy may include information about the provider's physical location. This policy may be published as part of a credential, or may be published as an authorized message with a specific format. Consumers of the data would typically resolve the location of the data first, via this policy or message, and then contact the provider of the data service to access the data. In typical CDN implementations, data verinyms are lightweight verinyms, and are also locked verinyms.

In one implementation, choosing providers is done on-demand, and a list of providers is not explicitly chosen by a consumer. In this case other criteria may determine which providers are used and which are not and include criteria such as price, locality, or bandwidth, as well as locations of data consumers. For example, it makes sense to only choose providers that have resources in an area if there is demand from consumers in that area.

In one embodiment, the owning verinym of the data being consumed may be contacted by the consumer directly. In this case, the owning verinym may choose a specific provider close to that user, and then issue to that user an authorized policy or credential that informs the user of the provider from which they should pull the data. In some embodiments, the data owner may also need to issue to the provider an authentic token, policy or message allowing that provider to access the data from its current storage repository.

In one implementation storage policies or authorized messages may be generated by an embodied verinym through execution of an ENT program module, or may be created via an external program that interfaces with an ENT node. Generated storage policies are then distributed to consumers during the consumer resolution phase, and those consumers would then choose the appropriate provider from which to download the requested data.

In one implementation, providers may allow hosted verinyms to use an execution context. In some implementations these are not locked verinyms and the verinyms may authorize and perform actions. In this case, the verinyms can be viewed as autonomous actors. With an execution context, the verinym may try to embody itself at remote locations based on its programming that are close to the consumer or group of consumers. In some implementations the verinym may marshal data owned by the verinym owner, such as embodying additional verinyms at its current location. These "smart" verinym actors have several benefits. First, the embodiment of the verinym ensures that the datum held by the verinym is localized and ready to share with consumers. Second, the verinym can periodically check its own status to see if a newer datum should be used or distributed. Third, this design is more decentralized, and allows the verinym to act in semi-disconnected networks or to proceed even if the owners are unavailable. Fourth, the verinym may be able to virtualize itself when no consumer demand is low or missing, saving resources and reducing cost. Finally, a self-sufficient verinym may be able to serve a smaller group of consumers more efficiently than a large centralized solution by utilizing more processing time or resources to look for optimal solutions. Often this is not possible in large centralized systems because of processing limitations and load.

Using the novel techniques presented herein, a new paradigm for creating digital systems emerges. Combining the resilient, authentic identity provided by ENT systems, the extended ability of verinyms to hold and manage state, an eco-system of providers that can serve the needs of verinyms, and a rich environment of ownership, contract agreements, and control policies, yields a system that has no existing parallel in modern technology. These extensible features allow a basis for a new digital foundation of authenticity, trust, and privacy that will fuel the emergence of highly resilient digital property ownership.

These advanced techniques provide a unique historic opportunity to interconnect divergent systems into a single integral whole. This new uniform ecosystem has been termed the Enternet, and can be thought of as the entirety of definable entities in a single network. That is, everything that can be defined by verinyms can be represented and connected when applying these techniques.

It is unprecedented to have a system of this scalability, security, and utility without any centralization of authority or resources. Using techniques found in GENT, semi-distributed chokepoints like those present in existing Group Authority constructs can be eliminated for many applications. Additionally, GENT and ENT concepts can coexist in one system wherein the majority of the bulk identification and distribution is handled using GENT principals, while human understandable naming and hierarchies can be handled via ENT system techniques. Finally, these techniques enable a world in which individual actors have, for the first time in history, absolute control over their digital assets, identities, and relationships.

Those of ordinary skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, and those provided in the accompanying documents. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein, and those provided in the accompanying documents, can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method for creating trusted authentic digital relationships in a computer network using a unique electronic entity identifier for an entity including, but not limited to a person, abstract entity, datum, good, or electronic device, the method comprising the steps of:
   acquiring, at a device, public key data for an asymmetric key pair comprising a public key and a private key;
   acquiring, at a device, a unique key identifier for the public key data;
   acquiring, at a device, a set of one or more policies, wherein each policy from the set of one or more policies comprises a set of machine-evaluable rules comprising one or more unique electronic entity identifiers and/or the unique key identifier, and at least one logical operator or mathematical function, wherein a total number of identifiers from the one or more unique electronic entity identifiers and/or the unique key identifier in the policy is greater than one;
   determining a unique electronic entity identifier for the entity, at a device, comprising a hash value of the set of one or more policies, wherein the determined unique electronic identifier represents a trusted digital identity of the entity for use in a computer network;
   replacing one or more unique electronic entity identifiers within the set of one or more policies with numeric or logical values;
   receiving, at a device, a message; and
   authenticating the received message, wherein the step of authenticating comprises:
      evaluating the set of one or more policies with the replaced one or more unique electronic entity identifiers to produce an affirmative or non-affirmative result.

2. The method of claim 1, wherein the determined unique key identifier comprises a hash value of the public key data.

3. The method of claim 1, further comprising the step of:
   transmitting, at a device, the set of one or more policies to an other device.

4. The method of claim 3, further comprising the steps of:
   receiving, at the other device, the set of one or more policies;
   calculating, at the other device, a hash value of the received set of one or more policies;
   validating, at the other device, that the calculated hash value of the received set of one or more policies matches the unique electronic entity identifier; and
   authenticating, at the other device, a received message signed using one or more private keys.

5. The method of claim 1, further comprising the steps of:
   authenticating the received message against one or more public keys represented by the unique key identifiers; and
   when the received message is authenticated, replacing that unique key identifier with a numeral or logical value.

6. The method of claim 1, further comprising the step of replacing one or the one or more unique electronic entity identifiers within a policy with at least one policy used to create the replaced unique electronic entity identifier.

7. The method of claim 1, further comprising the steps of recursively replacing the one or more unique electronic entity identifiers within a policy with policies used to create the replaced one or more unique electronic entity identifiers.

8. The method of claim 1, further comprising the step of replacing the unique electronic entity identifier with a new unique electronic entity identifier reflecting one or more updated or more accurate policies for the entity.

9. The method of claim 8, wherein the replacement of the unique electronic entity identifier with a new unique electronic entity identifier is authorized by the set of one or more policies.

10. The method of claim 8, wherein the replacement of the unique electronic entity identifier with a new unique electronic entity identifier is authorized through evaluation of the set of one or more policies.

11. A method for authenticating a unique entity identifier for an entity including, but not limited to a person, abstract entity, datum, good, or electronic device, method comprising the steps of:
   receiving, at a device, a set of one or more policies, wherein each policy from the set of one or more policies comprises a set of machine-evaluable rules comprising one or more unique entity identifiers and/or unique key identifiers, and at least one logical operator or mathematical function, wherein a total number of identifiers from the one or more unique entity identifiers and/or unique key identifiers in the policy is greater than one, wherein each unique key identifier comprises a hash value of public key data associated with a asymmetric key pair comprising a public key and a private key;
   receiving, at a device, a message signed using one or more private keys;
   receiving, at a device, a unique entity identifier;
   determining, at a device, a hash value of the received set of one or more policies;
   validating, at any device, that the calculated hash value of the received set of one or more policies matches the unique entity identifier; and
   authenticating, at a device, the received message, wherein the step of authenticating comprises:
      replacing one or more unique electronic entity identifiers within the set of one or more policies with numeric or logical values; and
      evaluating the set of one or more policies with the replaced one or more unique electronic entity identifiers to produce an affirmative or non-affirmative result.

* * * * *